United States Patent
Miyasa et al.

(10) Patent No.: US 9,311,709 B2
(45) Date of Patent: Apr. 12, 2016

(54) IMAGE PROCESSING APPARATUS AND IMAGE PROCESSING METHOD

(71) Applicant: CANON KABUSHIKI KAISHA, Tokyo (JP)

(72) Inventors: Kazuhiro Miyasa, Yokohama (JP); Takuro Miyasato, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/501,729

(22) Filed: Sep. 30, 2014

(65) Prior Publication Data
US 2015/0104091 A1 Apr. 16, 2015

(30) Foreign Application Priority Data
Oct. 11, 2013 (JP) .................................. 2013-214140

(51) Int. Cl.
*G06T 7/00* (2006.01)
*G06T 3/00* (2006.01)

(52) U.S. Cl.
CPC ............. *G06T 7/0032* (2013.01); *G06T 3/0068* (2013.01); *G06T 2207/10048* (2013.01); *G06T 2207/10088* (2013.01); *G06T 2207/30068* (2013.01); *G06T 2207/30148* (2013.01)

(58) Field of Classification Search
CPC ........ A61B 5/4312; A61B 8/463; A61B 8/13; A61B 2019/5425; G06T 2207/30068; G06T 2207/10072; G06T 2207/10132; G06T 3/0068; G06T 7/0014; G06T 7/0032
See application file for complete search history.

(56) References Cited

U.S. PATENT DOCUMENTS

| | | | | |
|---|---|---|---|---|
| 2005/0271302 A1* | 12/2005 | Khamene | ........... | G06K 9/00986 382/294 |
| 2010/0087733 A1 | 4/2010 | Nakajima et al. | | |
| 2010/0158332 A1* | 6/2010 | Rico | ..................... | A61B 5/4312 382/128 |
| 2012/0201445 A1* | 8/2012 | El-Baz | ................... | G06K 9/621 382/133 |
| 2013/0094742 A1* | 4/2013 | Feilkas | ................. | G06T 7/0014 382/131 |
| 2013/0094745 A1* | 4/2013 | Sundar | ................. | G06T 3/0068 382/132 |
| 2013/0169759 A1* | 7/2013 | Godavarty | ........... | A61B 5/0073 348/47 |
| 2014/0037177 A1* | 2/2014 | Endo | ..................... | G06T 7/0028 382/131 |
| 2014/0082542 A1* | 3/2014 | Zhang | .................... | G06F 19/321 715/771 |
| 2015/0043800 A1* | 2/2015 | Miyasa | ................. | G06T 7/0028 382/131 |
| 2015/0051489 A1* | 2/2015 | Caluser | ................ | A61B 8/0825 600/440 |
| 2015/0182191 A1* | 7/2015 | Caluser | ................ | A61B 5/4312 600/440 |

FOREIGN PATENT DOCUMENTS

| JP | 3871747 B2 | 1/2007 |
|---|---|---|
| JP | 2010088627 A | 4/2010 |

OTHER PUBLICATIONS

Angela Lee, et al. "Breast X-ray and MR Image Fusion using Finite Element Modeling", Proc. Workshop on Breast Image Analysis in conjunction with MICCAI 2011, 2011, pp. 129-136.
C. Tanner, et al. "Breast Shapes on Real and Simulated Mammograms", Proc. International Workshop on Digital Mammography 2010 (IWDM 2010), LNCS 6136, 2010, pp. 540-547.

* cited by examiner

*Primary Examiner* — Jingge Wu
(74) *Attorney, Agent, or Firm* — Fitzpatrick, Cella, Harper & Scinto

(57) ABSTRACT

A three-dimensional image captured by imaging a subject using a first imaging device is acquired. A two-dimensional image captured by imaging a surface of the subject using a second imaging device is acquired. Information representing the surface position of the subject is acquired from the three-dimensional image. A projection image in a case where seeing the three-dimensional image from the viewpoint of the second imaging device is generated based on the information representing the surface position. The three-dimensional image is aligned with the two-dimensional image with respect to the subject using the projection image and the two-dimensional image.

14 Claims, 17 Drawing Sheets

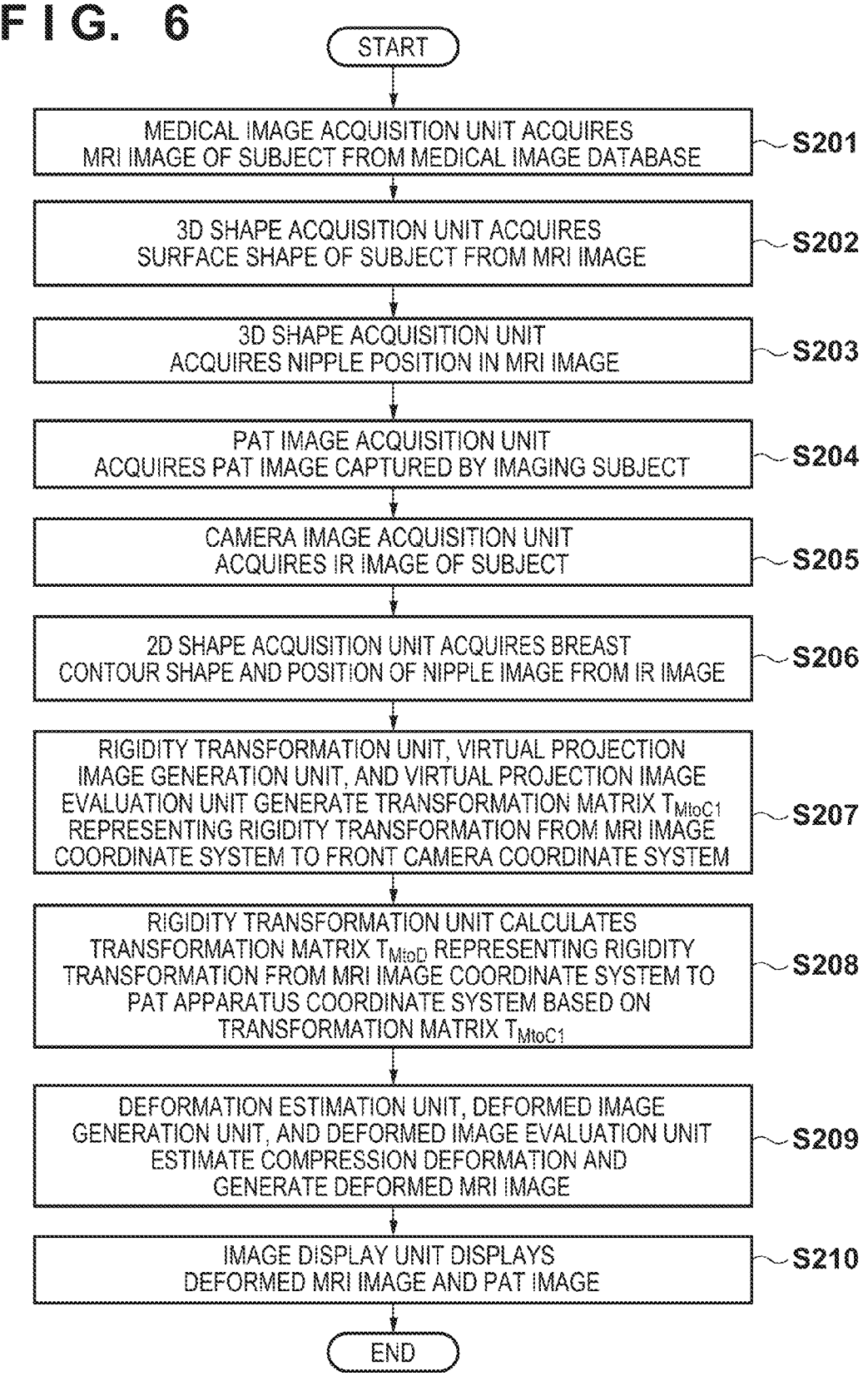

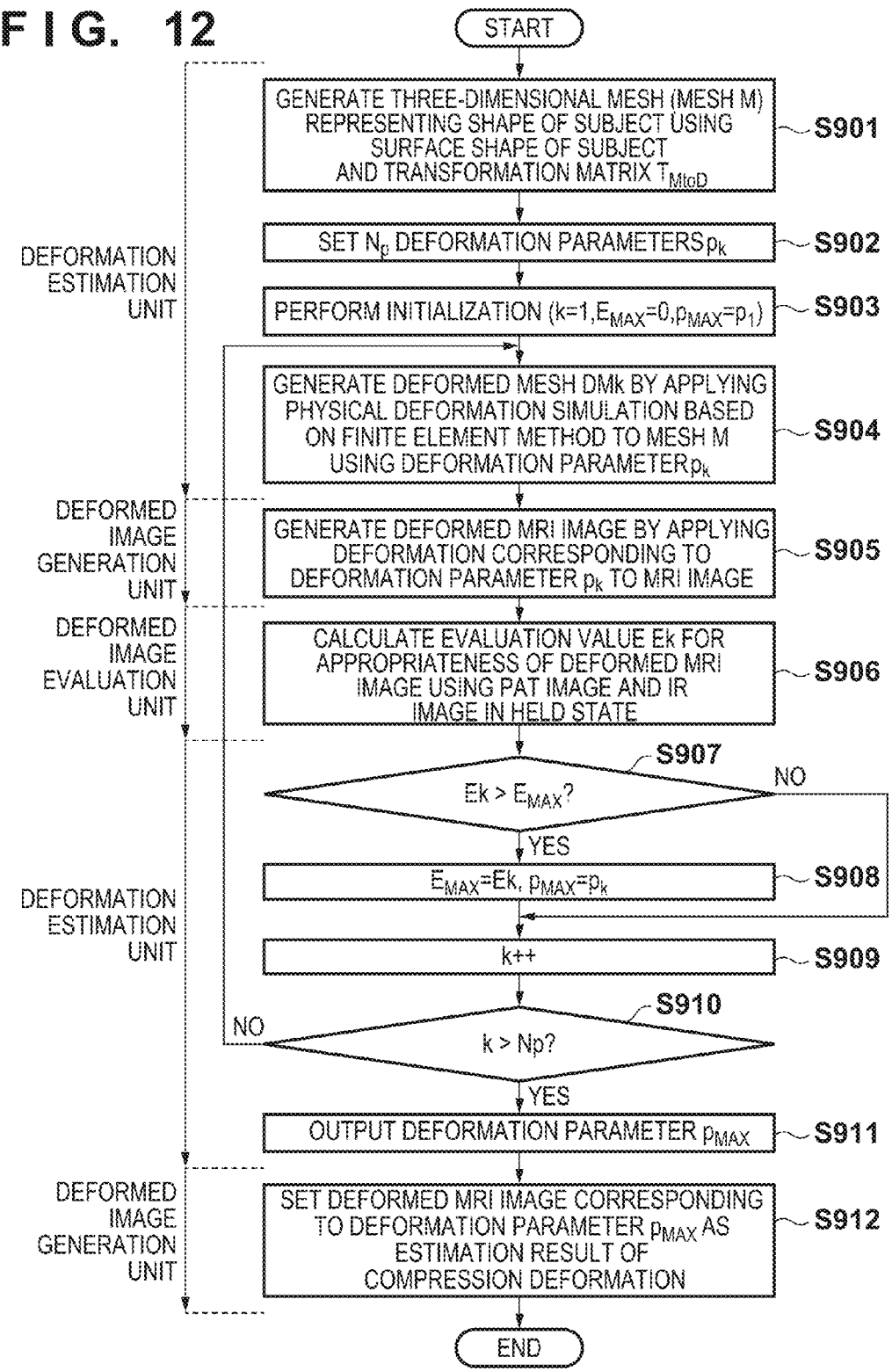

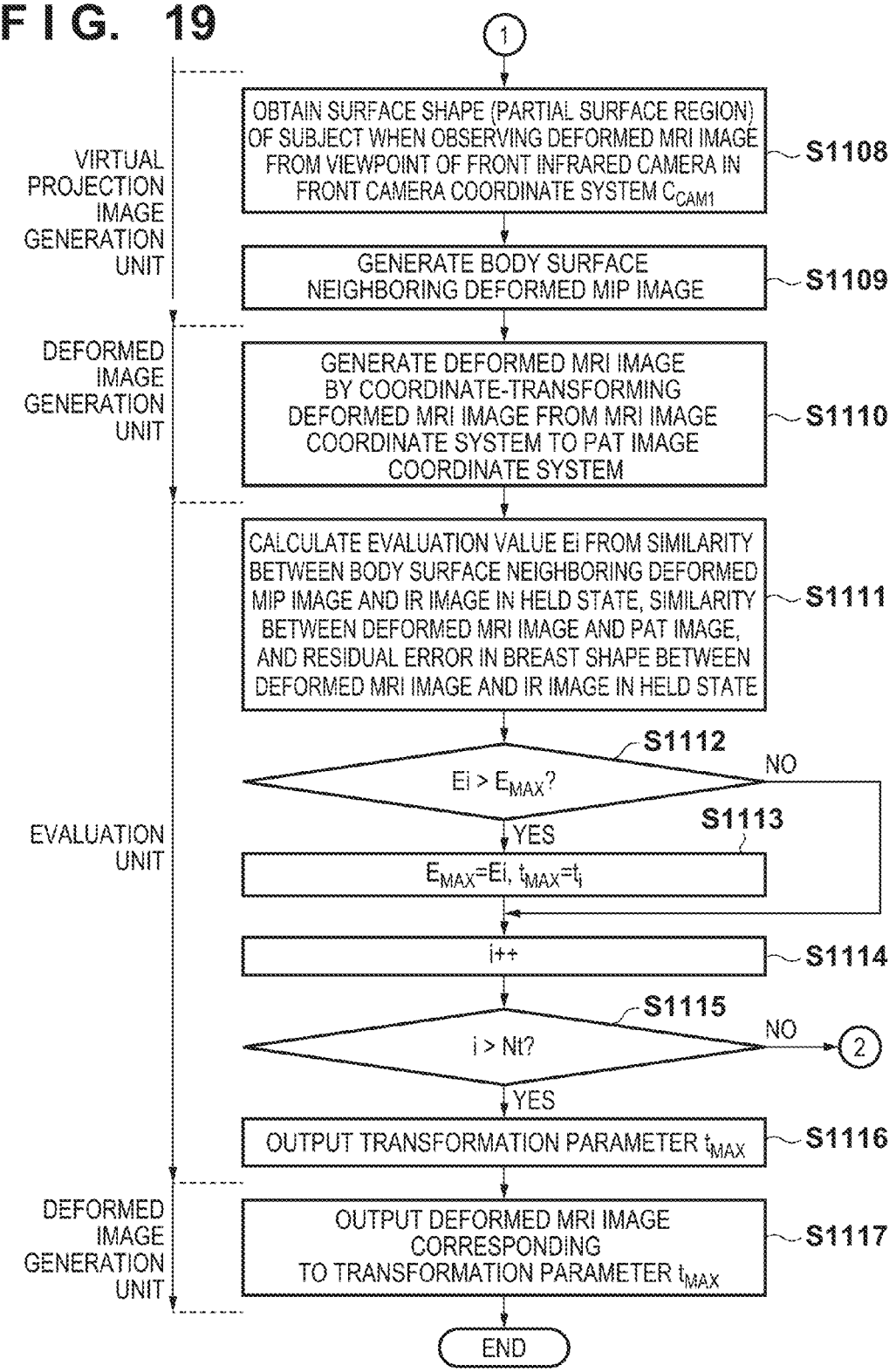

IMAGE PROCESSING APPARATUS AND IMAGE PROCESSING METHOD

BACKGROUND OF THE INVENTION

1. Field of the Invention

The present invention relates to image processing for the medical images captured by various types of medical image acquisition apparatuses (modalities).

2. Description of the Related Art

A photoacoustic tomograph (PAT) excites an absorbing substance in a subject by irradiating the subject with optical pulses, and detects the photoacoustic signal generated by the thermoelastic expansion of the absorbing substance, thereby imaging properties associated with the light absorption of the subject. In other words, the PAT images the distribution of optical energy accumulation amounts (the distribution of optical energy absorption densities) in a subject with respect to irradiation light. In addition, based on this distribution, the PAT images the distribution of optical absorption coefficients of the subject concerning an irradiation wavelength. In addition, it is possible to image the states of substances constituting the subject (for example, oxygen saturation of hemoglobin) based on the distributions of optical absorption coefficients concerning a plurality of wavelengths.

These images are expected to visualize information associated with new blood vessels generated inside and outside a malignant tumor such as cancer. These images will be collectively referred to as "PAT images (photoacoustic tomographic images)" hereinafter.

A PAT is designed to irradiate a human body with near-infrared pulses of low energy, and hence has difficulty in imaging a deep portion of the human body as compared with X-rays. According to Japanese Patent Laid-Open No. 2010-088627, the PAT designed to measure breasts is used in a form such that a breast is held by two flat plates (to be referred to as "holding plates" hereinafter) and imaged while the thickness of the breast is reduced. For this reason, when performing a diagnosis using both a PAT and another modality such as a magnetic resonance imaging (MRI) apparatus, it is possible to allow a doctor to efficiently perform the diagnosis by performing deformation alignment (deforming one image to align it with the other image) in consideration of compression deformation caused by holding the breast.

A method of aligning a PAT image with an MRI image includes an image matching method. For example, literature 1 described below discloses a technique for alignment between an X-ray mammography (MMG) image obtained by imaging a breast compressed by flat plates and an MRI image of the breast. More specifically, a deformed MRI image is generated by performing a physical deformation simulation by compression with flat plates with respect to an MRI image, a pseudo-MMG image is generated from the deformed MRI image, and alignment is performed by matching between the pseudo-MMG image and the actually captured MMG image.

Literature 1: Angela Lee, et al., "Breast X-ray and MR image fusion using finite element modeling," Proc. Workshop on Breast Image Analysis in conjunction with MICCAI 2011, pp. 129-136, 2011

In addition, literature 2 described below discloses a technique of evaluating the shape of a breast after deformation which is obtained as a result of performing a physical deformation simulation by compression with flat plates with respect to an MRI image based on the two-dimensional shape of the breast which is extracted from an MMG image.

Literature 2: C. Tanner, et al., "Breast Shapes on Real and Simulated Mammograms," Proc. Int. Workshop on Digital Mammography 2010 (IWDM 2010), LNCS 6136, pp. 540-547, 2010

Furthermore, an attempt has been made, as diagnosis support by alignment between a plurality of modalities different from the above, to generate (clip) and present an image of a slice (to be referred to as a "corresponding slice" hereinafter) corresponding to an imaging slice of an ultrasonic image from a reference image such as a computed tomographic image (CT image) or MRI image which is three-dimensional image data. For example, Japanese Patent No. 03871747 discloses a technique of aligning a CT image or MRI image as a reference image with a subject in advance, measuring the position and posture of an ultrasonic probe relative to the subject, and aligning the ultrasonic image with the reference image.

However, since the PAT and the MRI differ in their characteristics to be imaged, all the structures depicted in an MRI image do not match those on a PAT image. It is therefore difficult to execute high-accuracy alignment by performing only image matching. For this reason, it is necessary to manually input a plurality of corresponding points between two coordinate systems.

SUMMARY OF THE INVENTION

In one aspect, an image processing apparatus comprising: an image acquisition unit configured to acquire a three-dimensional image captured by imaging a subject using a first imaging device and a two-dimensional image captured by imaging a surface of the subject using a second imaging device; an information acquisition unit configured to acquire information representing a surface position of the subject from the three-dimensional image; a first generation unit configured to generate a projection image in a case where seeing the three-dimensional image from a viewpoint of the second imaging device, based on the information representing the surface position; and an alignment unit configured to align the three-dimensional image with the two-dimensional image with respect to the subject using the projection image and the two-dimensional image.

According to the aspect, it is possible to accurately align a three-dimensional image of a subject with the subject itself or another image obtained by imaging the subject.

Further features of the present invention will become apparent from the following description of exemplary embodiments with reference to the attached drawings.

BRIEF DESCRIPTION OF THE DRAWINGS

FIG. 6 is a flowchart for explaining the operation and processing by each unit of the image processing apparatus according to the first embodiment.

FIG. 12 is a flowchart for explaining the details of the estimation of compression deformation.

FIGS. 18 and 19 are flowcharts for explaining the details of the estimation of a position/posture and compression deformation.

DESCRIPTION OF THE EMBODIMENTS

Image processing according to an embodiment of the present invention will be described in detail below with reference to the accompanying drawings. Note that the scope of the present invention is not limited to the examples shown in the accompanying drawings.

First Embodiment

An image processing apparatus according to the first embodiment performs deformation alignment between a PAT image and an MRI image by comparing the MRI image with an image from an infrared camera mounted in a PAT (Photoacoustic Tomograph) and the PAT image, when a breast is a subject (subject to be examined). In other words, when the position or shape of a subject at the time of MRI imaging is called the "first state", and the position or shape of the subject at the time of PAT imaging is called the "second state", an MRI image representing the subject in the first state is deformed and aligned with the subject in the second state.

As practical processing, first of all, an infrared camera mounted in the PAT acquires a two-dimensional image by imaging a subject in an upheld state (to be referred to as an "early stage in the second state" hereinafter) before PAT imaging. An MRI image is then aligned with the two-dimensional image. In other words, rigid transformation between the subject in the first state and the subject in the second state (to be exact, an early stage in the second state) is estimated as an alignment parameter for the two subjects. With this rigid transformation being an initial value, a deformation parameter for compression deformation is estimated as an alignment parameter for the subject in the first state and the subject at the time of PAT imaging (that is, in the second state). In the first embodiment, alignment parameters between the PAT image and the MRI image are derived by these two-stage processes.

[Arrangement of Apparatus]

Figure 1:
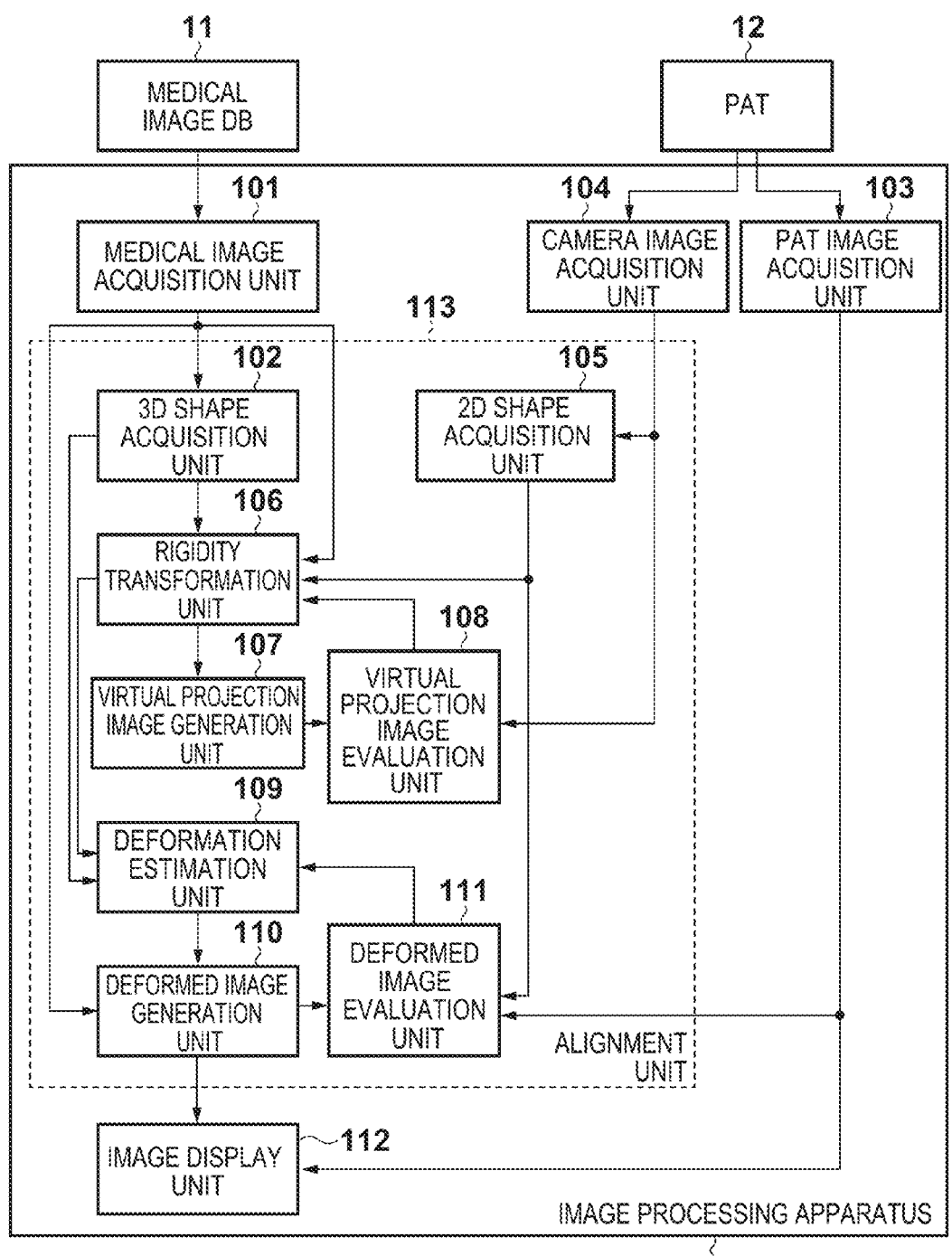
FIG. 1 is a block diagram showing the arrangement of a modality system including an image processing apparatus according to the first embodiment.

The block diagram of FIG. 1 shows the arrangement of a modality system including an image processing apparatus 10 according to the first embodiment. The image processing apparatus 10 is connected to a medical image DB (database) 11 and a PAT (Photoacoustic Tomograph) 12. The medical image DB 11 holds the three-dimensional image data obtained by imaging a breast as a subject using an MRI. The PAT 12 is a an apparatus which captures a PAT image, and holds a PAT image and an infrared camera image (to be referred to as an "IR image" hereinafter) of a subject.

Medical Image DB

Figure 2A:
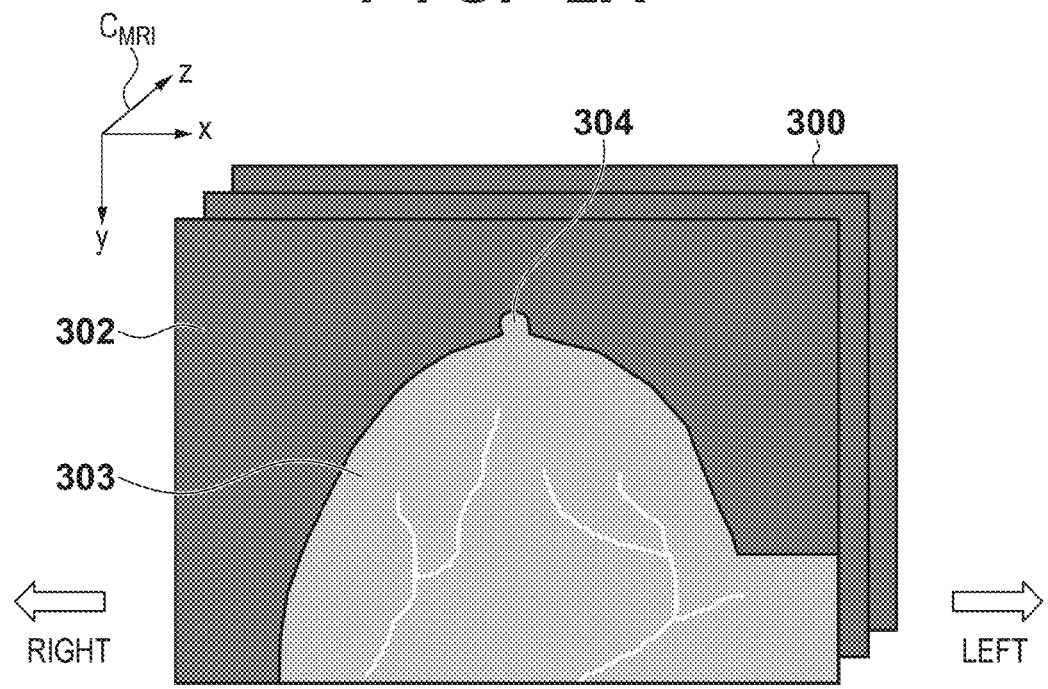
FIGS. 2A and 2B are views for explaining MRI images of a subject which are held in a medical image DB.

The MRI images of a subject held in the medical image DB 11 will be described with reference to FIGS. 2A and 2B. An MRI image 300 of a subject shown in FIG. 2A is a set (three-dimensional image data) of two-dimensional images (slices containing a nipple 304) obtained by slicing the subject along slices (axial slices) perpendicular to the craniocaudal direction of the human body. The positions of pixels constituting the MRI image 300 are defined in an MRI image coordinate system $C_{MRI}$. In addition, the MRI image 300 includes the imaging results of an extracorporeal region 302 of the subject and an intracorporeal region 303 of the subject.

Figure 2B:
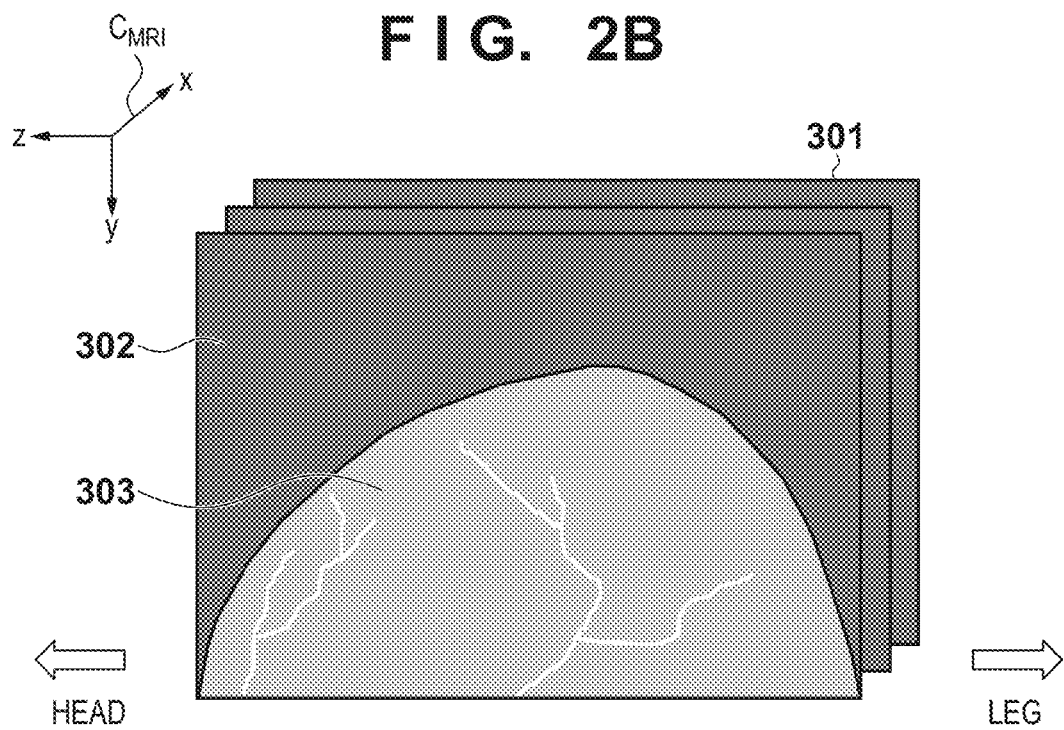

An MRI image 301 shown in FIG. 2B is a set (three-dimensional image data) of two-dimensional images obtained by slicing the subject along slices (sagittal slices) perpendicular to the transverse direction of the human body. Like the MRI image 300, the MRI image 301 includes the imaging results of the extracorporeal region 302 of the subject and the intracorporeal region 303 of the subject. Note that in this embodiment, the MRI image coordinate system $C_{MRI}$ is defined as a coordinate system in which the direction from the right-hand side to the left-hand side of a patient is the positive x-axis direction, the direction from the chest side to the back side is the positive y-axis direction, and the direction from the foot side to the head side is the positive z-axis direction.

PAT

Imaging of a subject by the PAT 12 will be described with reference to FIG. 3. A subject 500 is postured in the prone position on the bed on the upper surface of the PAT 12. One breast 501 as a subject is inserted into an opening portion 502 of the upper surface of the PAT 12. The breast 501 is held by two transparent holding plates (a fixed holding plate 503 on the foot side and a movable holding plate 504 on the head side) in a compressed state so as to allow irradiation light to reach the inside of the breast 501, and is imaged while its thickness is reduced. The breast is held by moving the movable holding plate 504 toward the foot side (toward the fixed holding plate 503).

Assume that both the fixed holding plate 503 and the movable holding plate 504 are flat plates, and surfaces (to be referred to as "holding surfaces" hereinafter) which come into contact with the breast 501 are planes. In addition, the PAT 12 measures the distance (to be referred to as the "holding thickness") between the fixed holding plate 503 and the movable holding plate 504 in a held state, and the holding thickness is stored in the header portion of a PAT image as additional information of the image.

A light source (not shown) applies near-infrared pulses as irradiation light from a direction perpendicular to the planes of the holding plates. An ultrasonic probe (not shown) arranged perpendicularly to the planes of the holding plates receives a photoacoustic signal generated in the subject.

A PAT apparatus coordinate system $C_{DEV}$ is defined for the PAT 12. The x-y plane is parallel to the flat surfaces of the fixed holding plate 503 and the movable holding plate 504, and the z-axis extends in the thickness direction of the held breast 501. As in the MRI image coordinate system $C_{MRI}$, the direction from the right-hand side to the left-hand side of the subject 500 is defined as the positive x-axis direction, the direction from the chest side (lower side) to the back side (upper side) is defined as the positive y-axis direction, and the direction from the foot side to the head side is defined as the positive z-axis direction. The origin of the PAT apparatus coordinate system $C_{DEV}$ is set at, for example, the lower end position on the right-hand side on the fixed holding plate 503. Assume that the PAT 12 will subsequently handle the relationship between the above coordinate system as a reference and another coordinate system.

Figure 4:
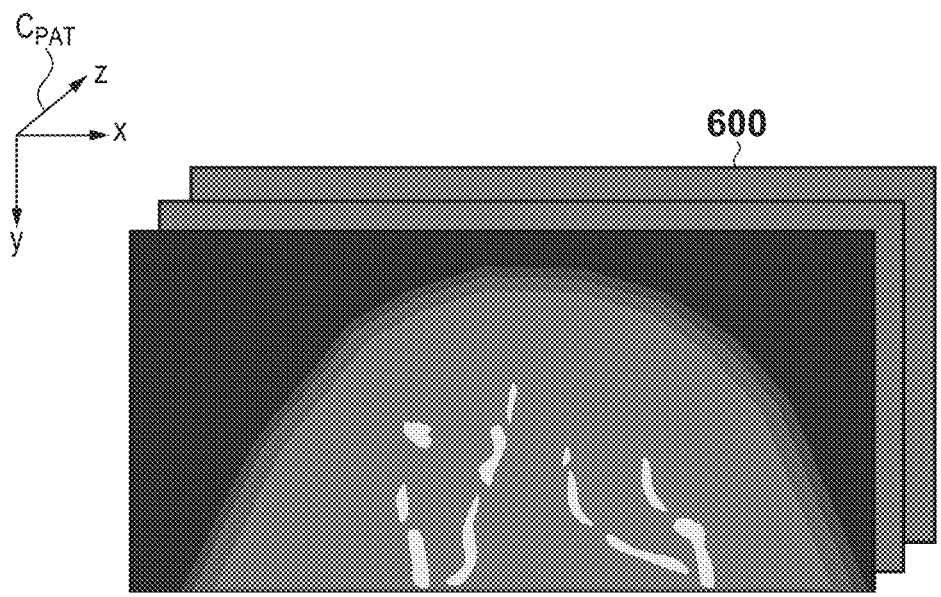
FIG. 4 is a view showing an example of a PAT image captured by the PAT.

FIG. 4 is a view showing an example of the PAT image captured by the PAT 12. A PAT image 600 is a set (three-dimensional image data) of two-dimensional images of axial slices as in FIG. 2A. In this embodiment, like the MRI image coordinate system $C_{MRI}$, a PAT image coordinate system $C_{PAT}$ is defined such that the direction from the right-hand side to the left-hand side of the subject 500 is the positive x-axis direction, the direction from the chest side to the back side is the positive y-axis direction, and the direction from the foot side to the head side is the positive z-axis direction.

A coordinate transformation matrix which performs transformation from the PAT image coordinate system $C_{PAT}$ to the PAT apparatus coordinate system $C_{DEV}$ is defined as "$T_{PtoD}$". Assume that all the coordinate transformation matrices appearing in the following description are 4×4 matrices each representing the translation and rotation of the coordinate system. The PAT image coordinate system $C_{PAT}$ is parallel to the PAT apparatus coordinate system $C_{DEV}$, and the origin position of $C_{PAT}$ changes in accordance with the imaging range of the subject 501. In other words, the coordinate transformation matrix $T_{PtoD}$ includes no rotation component and can be uniquely calculated based on an imaging range. Assume that the coordinate transformation matrix $T_{PtoD}$ is stored as additional information of the PAT image in the header portion of the image.

Figure 3:
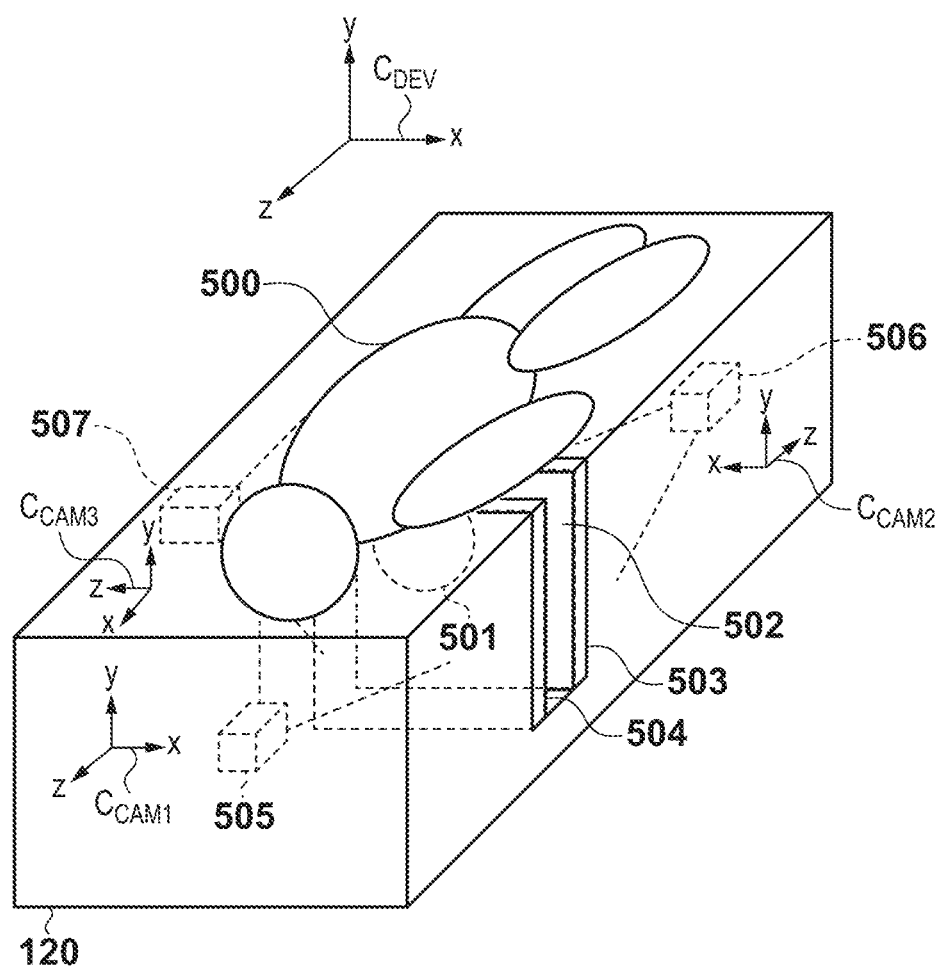
FIG. 3 is a view for explaining how a subject is imaged by a PAT.

As shown in FIG. 3, the PAT 12 is equipped with three infrared cameras (a front infrared camera 505, a rear infrared camera 506, and a side infrared camera 507) for imaging the outer appearance of the subject 501 and the state of blood vessels near the body surface. The front infrared camera 505 is installed at a position where it can image the outer appearance of the subject 501 from the head side through the movable holding plate 504. The rear infrared camera 506 is installed at a position where it can image the outer appearance of the subject 501 from the foot side through the fixed holding plate 503. The side infrared camera 507 is installed at a position where it can image the outer appearance of the subject 501 from a side surface.

The PAT 12 has a function of storing images of the subject 501 in a state in which the subject 501 is not held (to be referred to as an "upheld state" hereinafter) and in a state in which the subject 501 is held (to be referred to as a "held state" hereinafter), which are imaged by the infrareds camera 505 to 507. In the following description, images captured by the front infrared camera 505, the rear infrared camera 506, and the side infrared camera 507 in a held state are respectively represented by $I_{CAM1}$, $I_{CAM2}$, and $I_{CAM3}$. In addition, images captured by the front infrared camera 505, the rear infrared camera 506, and the side infrared camera 507 in an upheld state are respectively represented by $I'_{CAM1}$, $I'_{CAM2}$, and $I'_{CAM3}$.

The z-axis (indicating the negative direction of a visual axis) of a front camera coordinate system $C_{CAM1}$ of the front infrared camera 505 faces in almost the same direction as that of the z-axis of the PAT apparatus coordinate system $C_{DEV}$. Likewise, the z-axis of a coordinate system (rear camera coordinate system) $C_{CAM2}$ of the rear infrared camera 506 faces in almost the opposite direction to the z-axis of the PAT apparatus coordinate system $C_{DEV}$. In addition, a coordinate system (side camera coordinate system) $C_{CAM3}$ of the side infrared camera 507 faces in the −x-axis direction of the PAT apparatus coordinate system $C_{DEV}$.

Coordinate transformation matrices for transformation from the camera coordinate systems $C_{CAM1}$, $C_{CAM2}$, and $C_{CAM3}$ to the PAT apparatus coordinate system $C_{DEV}$ are respectively defined as $T_{C1toD}$, $T_{C2toD}$, and $T_{C3toD}$. The infrared cameras 505 to 507 have been calibrated in the PAT apparatus coordinate system $C_{DEV}$ (in other words, the positional relationships with the PAT 12 are known). The image processing apparatus 10 holds the above coordinate transformation matrices and internal parameters of the infrared cameras 505 to 507 as known information.

Figure 5:
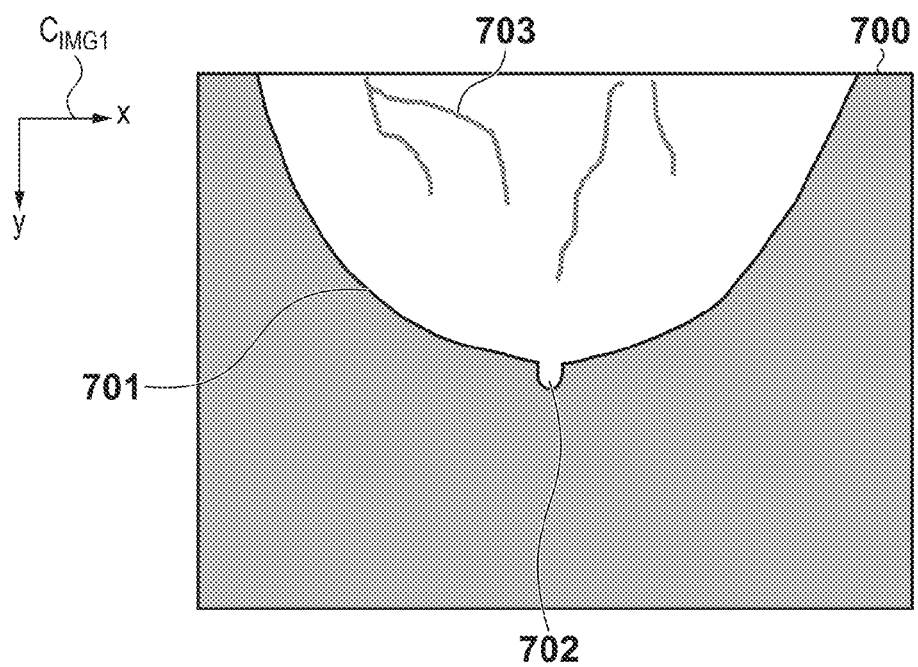
FIG. 5 is a view showing an example of a captured image $I_{CAM1}$ obtained by a front infrared camera in an unheld state.

FIG. 5 shows an example of the captured image $I_{CAM1}$ obtained by the front infrared camera 505 in an upheld state. An infrared camera is an apparatus which captures an image visualizing the intensity information of near-infrared light, and has the property of visualizing venous vessels (superficial vessels) located immediately below the skin as the surface of a subject using the following properties of near-infrared light:

The skin is made transparent by near-infrared light to some extent.

Near-infrared light is absorbed by a blood vessel portion including hemoglobin, and the blood vessel is depicted darker than the surroundings.

An IR image 700 can be handled as a morphological image to clearly depict the shape of a superficial vessel under the skin. Referring to FIG. 5, a breast contour shape 701 in a held state, a nipple 702, and a superficial vessel 703 are depicted on the IR image 700.

Note that coordinates on a two-dimensional coordinate system $C_{IMG1}$ of the captured image $I_{CAM1}$ obtained by the front infrared camera 505 have a one-to-one relationship with a straight line passing through the focal position as the origin and a point on a projection plane of the camera in a three-dimensional space, that is, a visual line. Since a coordinate transformation method used between a general captured image and a three-dimensional space is used for transformation between the coordinate system $C_{IMG1}$ of the captured image obtained by the front infrared camera 505 and the camera coordinate system $C_{CAM1}$, a description of the method will be omitted. In addition, since the captured images obtained by the rear infrared camera 506 and the side infrared camera 507 are the same as the captured image obtained by the front infrared camera 505 except for different viewpoint positions, a description about them will be omitted.

Image Processing Apparatus

The operation and processing by each unit of the image processing apparatus 10 according to the first embodiment will be described with reference to the flowchart of FIG. 6.

A medical image acquisition unit 101 acquires an MRI image of a subject, which is held in the medical image DB 11, and outputs the MRI image to a 3D (three-dimensional) shape acquisition unit 102, a rigidity transformation unit 106, and a deformed image generation unit 110 (S201).

The 3D shape acquisition unit 102 processes an input MRI image to detect the position (surface position) of each pixel corresponding to the surface of the subject and acquire information representing the surface shape of the subject (S202). In addition, the 3D shape acquisition unit 102 acquires the position of a feature point in the MRI image based on the three-dimensional curvature of the shape obtained from the detected surface positions (S203). If the subject is a breast, the feature point in the MRI image is the nipple. In the following description, the 3D shape acquisition unit 102 functions as an information acquisition unit which acquires information indicating the nipple position. The 3D shape acquisition unit 102 outputs the acquired surface shape and the nipple position to the rigidity transformation unit 106 and a deformation estimation unit 109. In this embodiment, the surface shape of the subject acquired from the MRI image is a shape model of the subject in an upheld state.

Figure 7A:
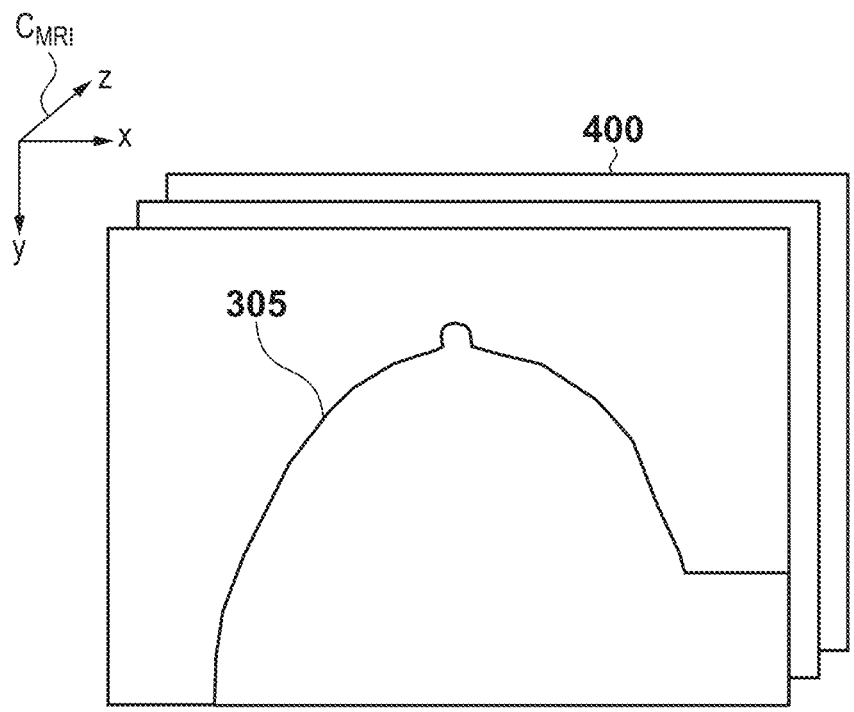
FIGS. 7A and 7B are views for explaining acquisition processing for a surface shape.
Figure 7B:
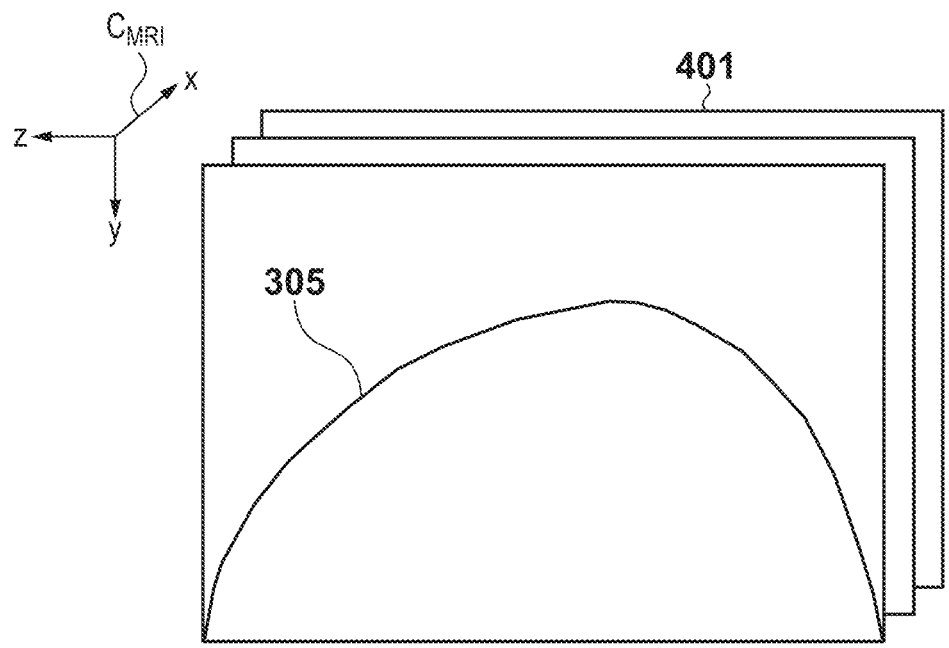

Acquisition processing for a surface shape will be described with reference to FIGS. 7A and 7B. FIGS. 7A and 7B show surface detection images 400 and 401 obtained by detecting a boundary 305 (surface positions) between the extracorporeal region 302 and the intracorporeal region 303 of the subject from the MRI images 300 and 301 shown in FIGS. 2A and 2B. The surface detection images 400 and 401 may be, for example, binary images which can discriminate the surface of the subject from the remaining portion.

In this embodiment, $N_S$ point groups $P_{Sk}$ ($1 \leq k \leq N_S$) are acquired as a surface shape of the subject, and the positions of the point groups are recorded as three-dimensional position coordinate vectors $V_{Sk\_MRI}$ in the MRI image coordinate system $C_{MRI}$.

A PAT image acquisition unit 103 acquires the PAT image of a subject imaged by the PAT 12, and outputs the PAT image to a deformed image evaluation unit 111 and an image display unit 112 (S204). In addition, the PAT image acquisition unit 103 outputs the additional information contained in the header portion of the PAT image, for example, the coordinate transformation matrices $T_{PtoD}$, $T_{C1toD}$, $T_{C2toD}$, and $T_{C3toD}$ to the deformed image evaluation unit 111. Assume that the PAT image acquired by the PAT image acquisition unit 103 is a three-dimensional image obtained by imaging the distribution of optical energy accumulation amount in the subject with respect to a predetermined wavelength.

A camera image acquisition unit 104 acquires the IR images of the subject in an upheld state and a held state which are captured by the infrared cameras 505 and 507 of the PAT 12, and outputs the IR images to a 2D (two-dimensional) shape acquisition unit 105 and a virtual projection image evaluation unit 108 (S205). The IR images acquired in this case are $I_{CAMi}$ and $I'_{CAMi}$ (i=1, 2, 3).

The PAT image acquisition unit 103 and the camera image acquisition unit 104 may directly acquire images from the PAT 12 in synchronism with image capturing by the PAT 12, or may acquire images captured and recorded in the past from a medical image recording apparatus (not shown).

The 2D shape acquisition unit 105 processes each input IR image to acquire a breast contour shape (701 in FIG. 5) and the position of the nipple image (702 in FIG. 5) and output the breast contour shape and the nipple position to the rigidity transformation unit 106 and the deformed image evaluation unit 111 (S206). For example, it is possible to use a general edge detection technique for the detection of a breast contour shape. In addition, the nipple position can be detected based on the curvature of a curve representing the boundary of the breast region. Note that the method of detecting a nipple contour shape and a nipple position is not limited to the above method.

The rigidity transformation unit 106, a virtual projection image generation unit 107, and a virtual projection image evaluation unit 108 align the subject in an unheld state with an MRI image using information of a superficial vessel depicted in each of the MRI image and the IR image in an unheld state (S207). Note that an unheld state is an early stage of the second state. More specifically, a virtual image is generated by virtually observing an MRI image using an infrared camera based on each of candidate values of hypothesized alignment parameters, and the position alignment parameter is estimated by comparing the virtual image with the IR image. Although this alignment (alignment in an unheld state) will be described in detail later, a transformation matrix $T_{MtoC1}$ representing rigidity transformation from the MRI image coordinate system $C_{MRI}$ to the front camera coordinate system $C_{CAM1}$ is acquired as an alignment parameter.

The rigidity transformation unit 106 calculates a transformation matrix $T_{MtoD}$ representing rigidity transformation from the MRI image coordinate system $C_{MRI}$ to the PAT apparatus coordinate system $C_{DEV}$ based on the transformation matrix $T_{MtoC1}$ (S208). In other words, the transformation matrix $T_{MtoD}$ is calculated by applying the transformation matrix $T_{C1toD}$ from the camera coordinate system $C_{CAM1}$ held in the image processing apparatus 10 to the PAT apparatus coordinate system $C_{DEV}$ to the transformation matrix $T_{MtoC1}$.

The deformation estimation unit 109, the deformed image generation unit 110, and the deformed image evaluation unit 111 align the subject in a held state with the MRI image based on the alignment result in an upheld state (to be referred to as "estimation of compression deformation" hereinafter) (S209). Although described in detail, compression deformation of the MRI image is estimated using a physical deformation simulation. In other words, a physical deformation simulation is performed while the deformation parameter is variously changed, and a predetermined evaluation value representing the appropriateness of deformation is obtained by comparing the resultant image with a PAT image. A deformation parameter which minimizes the evaluation value is then estimated as an alignment parameter. A deformed MRI image $I_{D\_MRIonP}$ (deformed three-dimensional image) is generated as an estimation result using the estimated deformation parameter.

Figure 8:
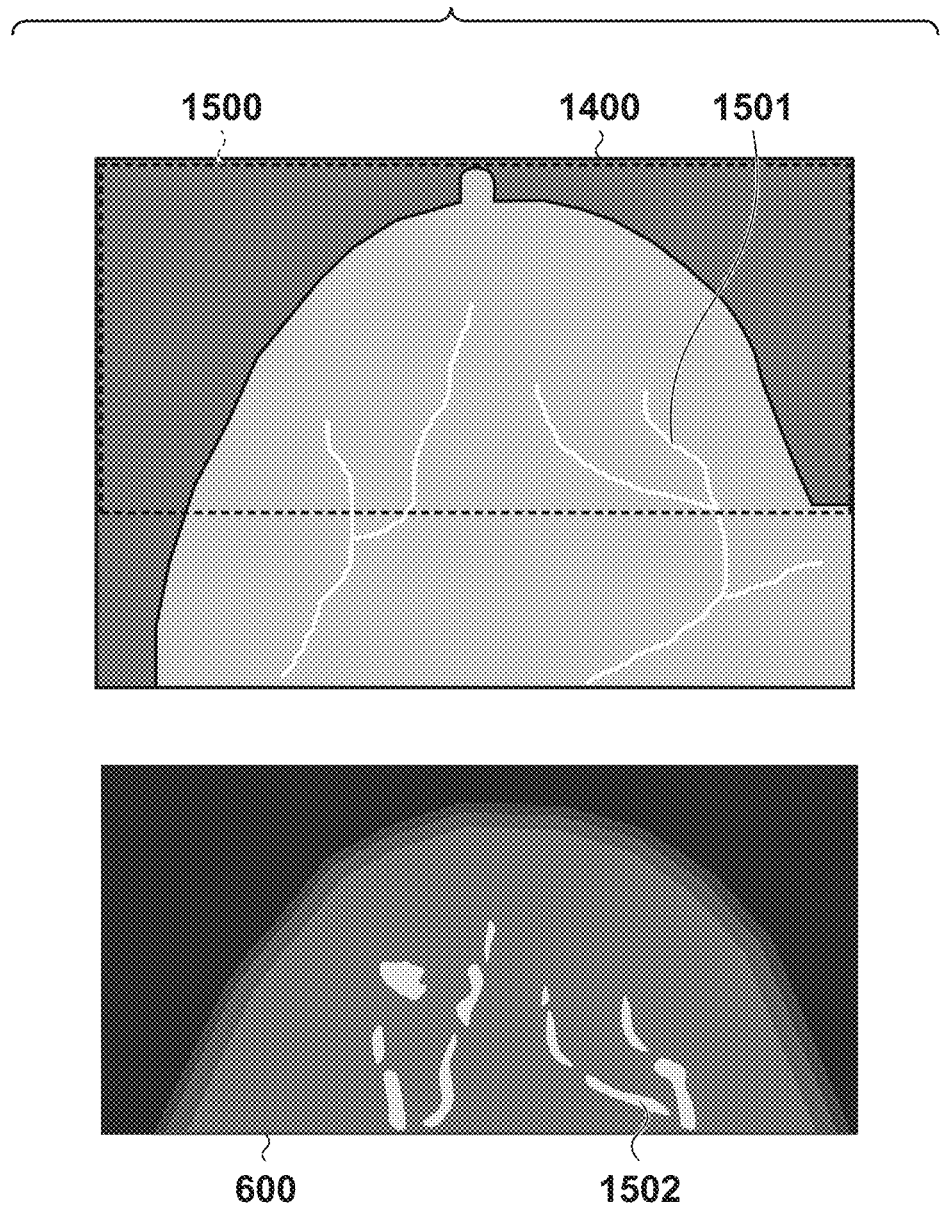
FIG. 8 is a view showing display examples of a deformed MRI image and a PAT image.

The image display unit 112 displays the generated deformed three-dimensional image (deformed MRI image) and the PAT image acquired in step S203 on a monitor (not shown) side by side (S210). FIG. 8 shows display examples of the deformed MRI image and the PAT image. In the example shown in FIG. 8, a deformed MRI image 1400 and the PAT image 600 of the same axial slice are vertically arranged side by side. A broken line rectangle 1500 superimposed on the deformed MRI image 1400 is display information presenting a region corresponding to the display region of the PAT image 600 to the user.

Note that an alignment unit 113 is constituted by the 3D shape acquisition unit 102, the 2D shape acquisition unit 105, the rigidity transformation unit 106, the virtual projection image generation unit 107, the virtual projection image evaluation unit 108, the deformation estimation unit 109, the deformed image generation unit 110, and the deformed image evaluation unit 111.

Alignment in Unheld State

Figure 9:
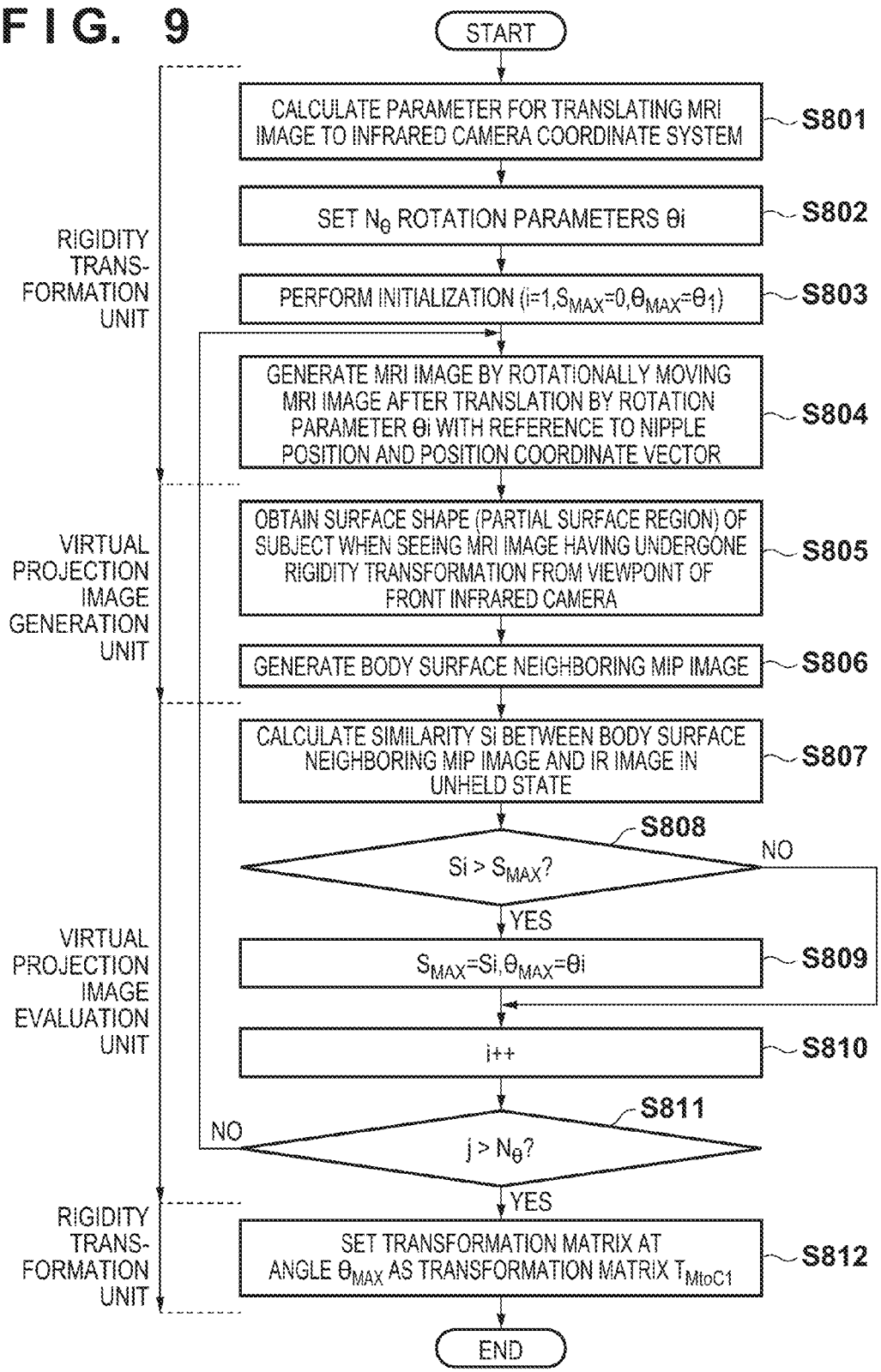
FIG. 9 is a flowchart for explaining the details of alignment in an unheld state.

In alignment in an unheld state, rigidity transformation from the MRI image coordinate system $C_{MRI}$ to the front camera coordinate system $C_{CAM1}$ is estimated. The details of alignment in an unheld state (S207) will be described with reference to the flowchart of FIG. 9.

The rigidity transformation unit 106 calculates a parameter for translation of an MRI image to the infrared camera coordinate system (front camera coordinate system) (S801). First of all, a three-dimensional nipple position in the front camera coordinate system $C_{CAM1}$ is calculated from the two-dimensional nipple position obtained from each IR image in an unheld state based on the triangulation principle. The transformation matrix $T_{MtoC1}$ representing translation from the MRI image coordinate system $C_{MRI}$ to the front camera coordinate system $C_{CAM1}$ is calculated so as to match the nipple position in the MRI image with the three-dimensional nipple position in an unheld state obtained from each IR image.

Subsequently, the rigidity transformation unit 106 sets candidate values (hypotheses) $\theta i=\{\theta x, \theta_y, \theta z\}$ ($1 \leq i \leq n_\theta$) of a plurality of ($N_\theta$) of rotation parameters as combinations of values which the respective components (rotational angles about the three axes) for the rotational movement of the subject in the MRI image can take (S802). In other words, the rigidity transformation unit 106 sets candidate values of rigidity transformation parameters as combinations of the rotation parameter candidates θi in this processing and the translation parameters calculated in step S801. In addition, considering that the relationship between the PAT image coordinate system and the front camera coordinate system is known, this operation is equivalent to setting candidate values of rigidity transformation from the MRI image (the subject in the first state) to the PAT image (the subject in the second state). Letting θx be a rotational angle about the x-axis, and θz be a rotational angle about the z-axis, the following five angles are set in increments of 5° in the range from −10° to +10°.

$\theta x=\{-10, -5, 0, +5, +10\}$
$\theta z=\{-10, -5, 0, +5, +10\}$

In addition, letting θy be a rotational angle about the y-axis, the following 72 angles are set in increments of 5° in the range from −180° to +180°.

$\theta_y=\{-180, -175, \ldots, -5, 0, +5, \ldots, +175, +180\}$

In this case, the number $N_\theta$ of values (the total number of candidate values (hypotheses)) which the rotation parameter θi can take is 1800 (that is, $1 \leq i \leq 1800$).

The rigidity transformation unit 106 then performs initialization (S803). In other words, the rigidity transformation unit 106 sets 1 to a loop variable i, 0 to a maximum value $S_{MAX}$ of similarities Si (to be described later), and $\theta_1$ to an angle $\theta_{MAX}$ (to be described later).

The rigidity transformation unit 106 then outputs an MRI image $I_{MRIonC1}i$ obtained by rotationally moving the MRI image after translation by the rotation parameter θi with reference to the nipple position and a position coordinate vector $v_{Sk\_MRIonC1}i$ to the virtual projection image generation unit 107 (S804). In other words, the rigidity transformation unit 106 calculates a transformation matrix T2i which rotationally moves the image by the rotation parameter θi in the front camera coordinate system $C_{CAM1}$. Subsequently, the rigidity transformation unit 106 derives a transformation matrix $T_{MtoC1}i$ representing the rigidity transformation obtained by multiplying a transformation matrix $T1_{MtoC1}$ for translation, derived in step S801, by the transformation matrix T2i. The rigidity transformation unit 106 then generates the MRI image and the position coordinate vector $v_{Sk\_MRIonC1}i$ by coordinate transformation of the MRI image and a position coordinate vector $v_{Sk\_MRI}$ of the surface shape of the subject using the transformation matrix $T_{MtoC1}i$.

The virtual projection image generation unit 107 obtains, as a partial surface region, the surface shape of the subject expected to enter the field of view when observing the MRI image having undergone rigidity transformation from the viewpoint of the front infrared camera 505 (S805). In other words, the virtual projection image generation unit 107 generates a virtual image obtained when the MRI image having undergone rigidity transformation is seen from the viewpoint of the front infrared camera 505, based on the surface shape as information representing the surface position and the rigidity transformation parameter (the transformation matrix $T_{MtoC1}i$ representing rigidity transformation) as a candidate value of the alignment parameter.

Figure 10:
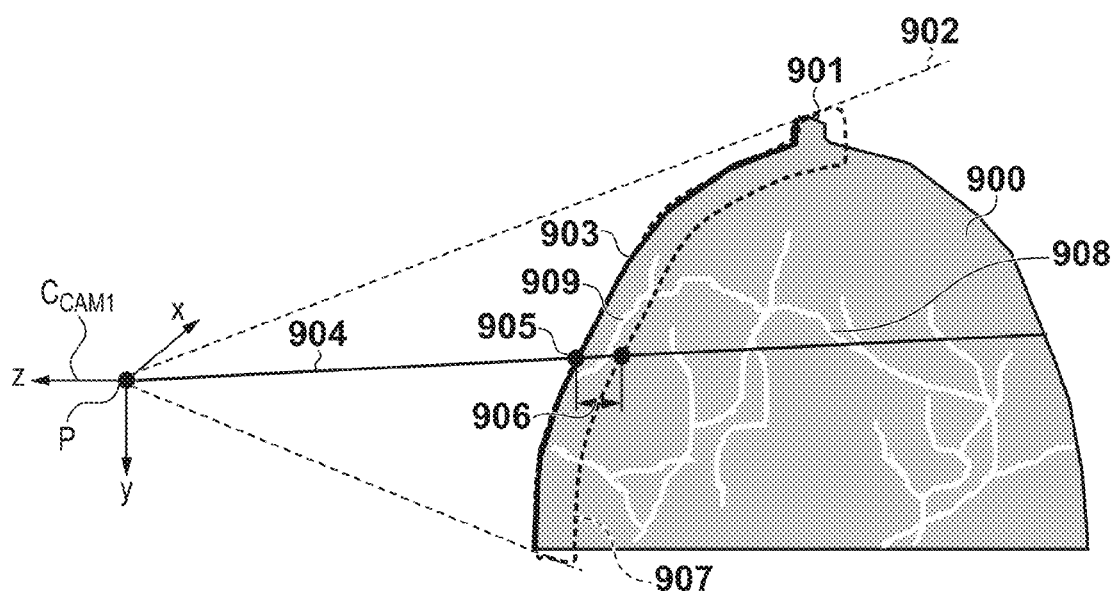
FIG. 10 is a view for explaining the processing in which a virtual projection image generation unit obtains a partial surface region.

The processing in which the virtual projection image generation unit 107 obtains a partial surface region (S805) will be described with reference to FIG. 10. FIG. 10 shows the state of a subject on an MRI image which is observed from a viewpoint P of the front infrared camera 505. An MRI breast region 900 has undergone rigidity transformation so as to match a nipple position 901 with the nipple position in an infrared camera. In step S805, the virtual projection image generation unit 107 obtains a partial surface region 903 observed from the viewpoint P by performing perspective projection with reference to the position/posture of the viewpoint P. In other words, the virtual projection image generation unit 107 extends a projection line 904 from the viewpoint P first, and specifies an observation range 902 in which the projection line 904 intersects with the position coordinate vector $v_{Sk\_MRIonC1}i$ representing the body surface shape of the MRI breast region 900. The virtual projection image generation unit 107 then obtains a body surface point 905 with which the projection line 904 intersects first, with the viewpoint P being a starting point, from the position coordinate vector $v_{Sk\_MRIonC1}i$ in the observation range 902. The partial surface region 903 is then determined by obtaining the surface points 905 with respect to all the projection lines 904 included in the observation range 902.

Subsequently, the virtual projection image generation unit 107 generates an MIP image using neighborhood information of the partial surface region 903 in the MRI image having undergone rigidity transformation, and outputs the generated MIP image to the virtual projection image evaluation unit 108 (S806). Note that MIP stands for maximum intensity projection, and the MIP image generated in step S806 will be referred to as a "body surface neighboring MIP image $I_{MIPonC1}i$" hereinafter.

In step S806, the virtual projection image generation unit 107 sets a body surface neighboring zone 906 having the body surface point 905 as a starting point, with which the projection line 904 intersects first, and a predetermined distance (for example, 5 mm) in a direction away from the viewpoint P. The virtual projection image generation unit 107 then defines a body surface neighboring region 907 by setting the body surface neighboring zones 906 with respect to all the projection lines 904 included in the observation range 902. Subsequently, the virtual projection image generation unit 107 performs perspective projection with reference to the position/posture of the viewpoint P, and generates the body surface neighboring MIP image $I_{MIPonC1}i$ as an MIP image limited to a region, of the MRI image $I_{MRIonC1}i$, which is included in the body surface neighboring region 907. This generates an MIP image by visualizing only the information of a superficial vessel 909, in a blood vessel region 908 in the MRI image, which exists near the body surface on the front infrared camera 505 side. Note that when generating the body surface neighboring region 907, the skin of the subject may not be included in the region. More specifically, the region obtained by making the partial surface region 903 have a predetermined thickness corresponding to the skin thickness may be derived as a skin region, and the skin region may be excluded from the body surface neighboring region 907 obtained by the above processing. The skin of the subject has a high luminance value in the MRI image. This exclusion processing can therefore depict a superficial vessel more clearly in the MIP image to be generated.

As described above, it is possible to prevent the visualization of a blood vessel region in the breast or a blood vessel region existing near the body surface on the opposite side to the front infrared camera 505 by visualizing only the information of a region located near the body surface and expected to be observed from the viewpoint P of the front infrared camera 505. In other words, it is possible to generate the body surface neighboring MIP image $I_{MIPonC1}$i as an MIP image nearer to the actual IR image.

Note that the method of generating the body surface neighboring MIP image $I_{MIPonC1}$i is not limited to the above method as long as only a region near the body surface can be visualized or a region near the body surface can be visualized while being enhanced. There is available another method of generating an MIP image while reducing a weight corresponding to a luminance value as the distance from the body surface point 905 on the projection line 904 increases in a direction away from the viewpoint P. This method generates an MIP image with luminance values being increased toward the body surface in a region inside a breast, and hence generates an MIP image with enhanced superficial vessels. Obviously, when generating an MIP image by the above processing, it is possible to more clearly depict superficial vessels by excluding a skin region from depiction targets.

Figure 11:
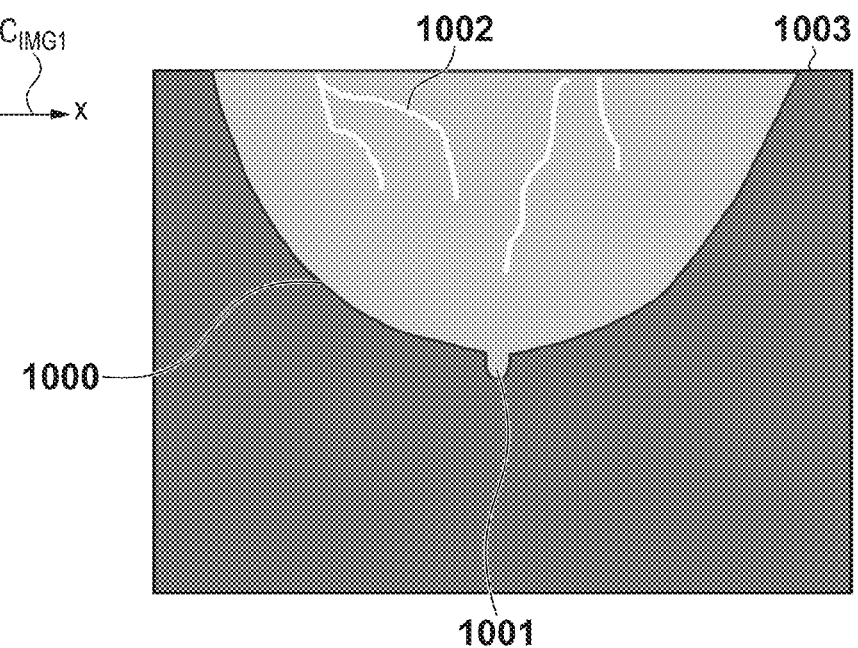
FIG. 11 is a view showing an MIP image using the body surface neighborhood information of a subject in an MRI image.

FIG. 11 shows an MIP image 1003 using body surface neighborhood information of a subject in an MRI image. Referring to FIG. 11, the body surface neighboring MIP image $I_{MIPonC1}$i is displayed as a two-dimensional image on the two-dimensional coordinate system $C_{IMG1}$. This is because coordinate transformation at the time of the generation of a two-dimensional MIP image by perspective projection based on the viewpoint P (S806) is geometrically equivalent to coordinate transformation (camera imaging process) from the three-dimensional front camera coordinate system $C_{CAM1}$ to the two-dimensional front camera image coordinate system $C_{IMG1}$.

In addition, since a region outside the body surface is not included in processing targets when generating an MIP image, there is no significant luminance value outside a breast contour shape 1000. In addition, rigidity transformation has been performed such that the nipple position 901 in an MRI image coincides with the nipple position in the captured image $I_{CAM1}$ obtained by the front infrared camera 505, a nipple 1001 in the MIP image coincides with the nipple 702 in the captured image $I_{CAM1}$ (FIG. 5). In the MIP image, a superficial vessel 1002 is visualized in particular as a high-luminance region.

The virtual projection image evaluation unit 108 then calculates the similarity Si between the body surface neighboring MIP image $I_{MIPonC1}$i and the IR image $I'_{CAM1}$ in an unheld state based on the luminance information of the superficial vessel visualized in both the images (S807).

In step S807, the virtual projection image evaluation unit 108 excludes the regions, of both the body surface neighboring MIP image $I_{MIPonC1}$i and the IR image $I'_{CAM1}$ in an unheld state, which are located outside the breasts from the similarity calculation regions, and limits the similarity calculation regions to the regions inside the breasts.

The superficial vessel 1002 in the body surface neighboring MIP image $I_{MIPonC1}$i is visualized with higher luminance than that of the surrounding breast region. On the other hand, the superficial vessel 703 in the IR image $I'_{CAM1}$ is visualized with lower luminance than that of the surrounding breast region. For this reason, the virtual projection image evaluation unit 108 inverts the luminance value of the body surface neighboring MIP image $I_{MIPonC1}$i to make it possible to directly compare luminance information between the images. The virtual projection image evaluation unit 108 then calculates the similarity Si ($0 \leq Si \leq 1$) between the body surface neighboring MIP image, whose luminance value has been inverted, and the IR image $I'_{CAM1}$. Assume that the value of the similarity Si increases (toward 1) when the superficial vessel 1002 (FIG. 11) in the body surface neighboring MIP image $I_{MIPonC1}$i becomes similar to the superficial vessel 703 (FIG. 5) in the IR image $I'_{CAM1}$.

Note that in this embodiment, the mutual information amount between images is used as an evaluation criterion for the similarity Si. However, the evaluation criterion to be used is not limited to this, and a known technique using a cross-correlation coefficient or SSD (sum of squared difference) may be used. In addition, there is no need to use an evaluation criterion directly based on a luminance value. For example, image features such as edges may be detected from two images, and a criterion that calculates the similarity or degree of coincidence between them may be used.

The virtual projection image evaluation unit 108 then compares the similarity Si with the maximum value $S_{MAX}$ of similarities (S808). If the similarity Si exceeds the maximum value $S_{MAX}$ (Si>$S_{MAX}$), $S_{MAX}$ is updated ($S_{MAX}$=Si), and the angle $\theta_{MAX}$ corresponding to $S_{MAX}$ is updated ($\theta_{MAX}$=$\theta$i) (S809). If the similarity Si is equal to or less than the maximum value $S_{MAX}$ (Si$\leq$$S_{MAX}$), $S_{MAX}$ is not updated.

The virtual projection image evaluation unit 108 then increments a loop variable i (S810), and compares the loop variable i with a total number $N_\theta$ of hypotheses (S811). If the loop variable i is equal to or less than the total number $N_\theta$ of hypotheses (i$\leq$$N_\theta$), the process returns to step S804. If the loop variable i exceeds the total number $N_\theta$ of hypotheses (i>$N_\theta$), the process advances to step S812. In other words, the processing from step S804 to step S811 is repeated by the total number $N_\theta$ of hypotheses.

When the processing corresponding to the total number $N_\theta$ of hypotheses is complete, the rigidity transformation unit 106 sets a transformation matrix $T_{MtoC1}$MAX at the angle $\theta_{MAX}$ as the final transformation matrix $T_{MtoC1}$ representing rigidity transformation from the MRI image coordinate system $C_{MRI}$ to the front camera coordinate system $C_{CAM1}$ (S812). In other words, the rotation parameter $\theta_{MAX}$ corresponding to the maximum value $S_{MAX}$ of similarities is selected from a plurality of rotation parameters.

With the above operation, the processing of alignment (S207) in an upheld state performed by the rigidity transformation unit 106, the virtual projection image generation unit 107, and the virtual projection image evaluation unit 108 is terminated. This processing obtains the transformation matrix $T_{MtoC1}$ based on the angle $\theta_{MAX}$ at which the body surface neighboring MIP image $I_{MIPonC1}$i generated based on various rigidity transformation parameter hypotheses (that is, rotation parameter hypotheses $\theta$i) becomes most similar to the IR image $I'_{CAM1}$.

The above description has exemplified the case in which the body surface neighboring MIP image $I_{MIPonC1}$i transformed to the front camera image coordinate system $C_{IMG1}$ is generated, and the similarity Si with the image $I'_{CAM1}$ captured by the front infrared camera 505 is evaluated. However, an evaluation target of the similarity Si is not limited to the front infrared camera 505.

For example, the body surface neighboring MIP image $I_{MIPonC1}$i transformed to the rear camera image coordinate system $C_{IMG2}$ or the side camera image coordinate system $C_{IMG3}$ is generated. It is then possible to evaluate the similarity between the body surface neighboring MIP image $I_{MIPonC1}$i and the image $I'_{CAM2}$ captured by the rear infrared camera 506 or the image $I'_{CAM3}$ captured by the side infrared camera 507. In this case, the viewpoint P for perspective projection in steps S805 and S806 may be replaced with the camera viewpoint of the rear or side infrared camera 506 or 507 with respect to the candidate value $T_{MtoC1}$i of a transformation matrix obtained in step S804.

In this case, the MRI image $I_{MRIonC1}i$ and the position coordinate vector $v_{Sk\_MRIonC1}i$ are transformed to the front camera coordinate system $C_{IMG1}$ in step S804. Therefore, as the position/posture of a camera viewpoint used for this perspective projection, a position/posture expressed on the front camera coordinate system $C_{IMG1}$ may be used.

Note that as described above, the positional relationships between the respective infrared cameras (front surface, side surface, and rear surface) are associated with each other with reference to the PAT apparatus coordinate system $C_{DEV}$. This makes it possible to derive a transformation matrix from the front camera coordinate system $C_{CAM1}$ to the rear camera coordinate system $C_{CAM2}$ or side camera coordinate system $C_{CAM3}$. In other words, it is possible to derive the position/posture of the camera viewpoint of the rear or side infrared camera in the front camera coordinate system $C_{CAM1}$.

Note that an integrated similarity may be calculated by integrating similarities based on the front, rear, and side infrared cameras, and the similarity may be evaluated. Integrated similarities include the weighted average value, maximum value, minimum value, or median value of these three types of similarities. According to the above description, the rotation parameter θi is set and coordinate transformation for perspective projection of an MRI image on each camera coordinate system is performed with reference to the front camera coordinate system $C_{CAM1}$. However, candidate values for an alignment parameter for the rigidity transformation $T_{MtoD}$ between $C_{MRI}$ and $C_{DEV}$ may be set with reference to the PAT apparatus coordinate system $C_{DEV}$. In this case, after viewing transformation to each infrared camera is performed in addition to rigidity transformation from $C_{MRI}$ to $C_{DEV}$, a body surface neighboring MIP image is generated by the same processing as that in step S806. Subsequently, an alignment parameter may be estimated based on the similarity evaluation with each infrared image.

Estimation of Compression Deformation

The details of estimation of compression deformation (S209) will be described with reference to the flowchart of FIG. 12.

The deformation estimation unit 109 generates a three-dimensional mesh (to be referred to as a "mesh M" hereinafter) representing the surface shape of a subject using the surface shape of the subject acquired in step S202 and the transformation matrix $T_{MtoD}$ acquired in step S208 (S901). In other words, the deformation estimation unit 109 calculates a position coordinate vector $V_{Si\_MRIonD}$ (1≤i≤Ns) of a subject surface point group in the PAT apparatus coordinate system $C_{DEV}$ by applying coordinate transformation using the coordinate transformation matrix $T_{MtoD}$ to a surface shape $V_{Sk\_MRI}$ of the subject. An inner region of the subject is then discriminated based on the surface shape represented by the position coordinate vector $V_{Si\_MRIonD}$ and the mesh M is arranged in the inner region.

Figure 13A:
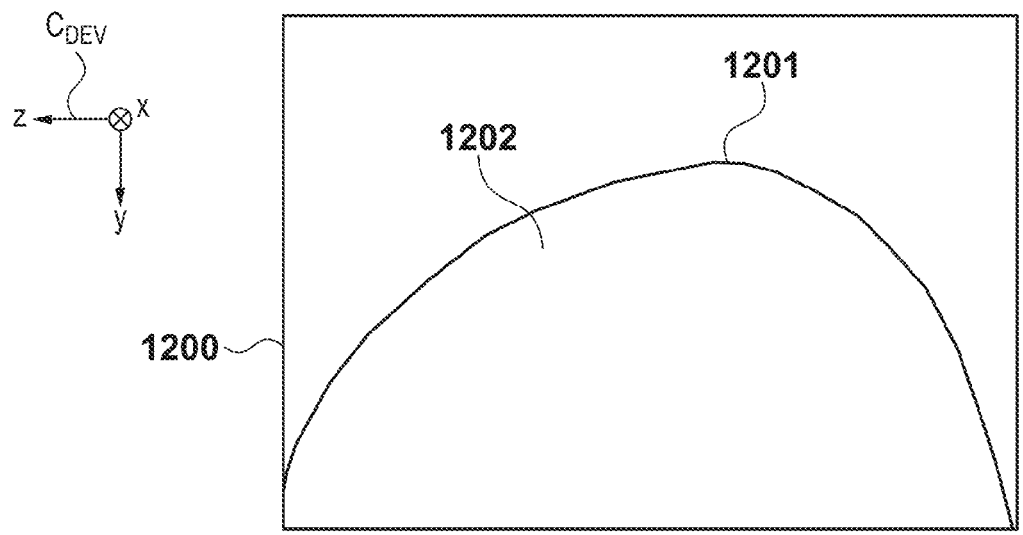
FIGS. 13A and 13B are schematic views showing a method of generating a mesh M.
Figure 13B:
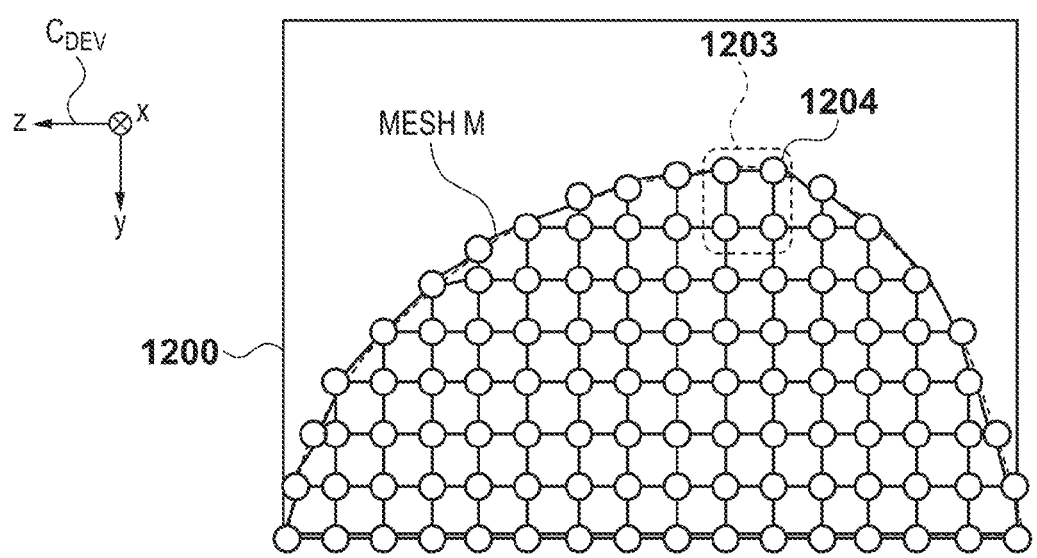

FIGS. 13A and 13B are schematic views showing a method of generating the mesh M. FIG. 13A is a sagittal slice of a processing target region 1200 of the subject, and shows a surface position 1201 of the subject on the sagittal slice and a corresponding inner region 1202. As shown in FIG. 13B, the mesh M is generated by arranging elements 1203 as three-dimensional structures such as hexahedrons or tetrahedrons in the inner region 1202 of the subject. The mesh M is described by the positions of vertices (nodes) 1204 of these elements and concatenation information.

In the following description, the number of nodes of the mesh M which are arranged in step S901 is represented by $N_m$, and the position of each node is represented by $S_L$ (1≤L≤$N_m$). Since a displacement field in the elements can be expressed by the displacement of each node, it is possible to obtain the displacement of an arbitrary point in the subject based on this displacement.

The deformation estimation unit 109 generates a plurality of ($N_p$) of deformation parameter hypotheses $p_k$ (1≤k≤$N_p$) by combining values which the respective components (Young's moduli, Poisson ratios, and the like of the subject) of deformation parameters can take (S902). For example, the deformation estimation unit 109 generates the deformation parameters $p_k$ by dividing the range of values which each component can take at proper intervals and obtaining all combinations of divided ranges. For example, when Young's modulus ratio $p_y$ and a Poisson ratio $p_p$ are components of the deformation parameter $p_k$, the Young's modulus ratio $p_y$ and the Poisson ratio $p_p$ can take the following values.

$p_y$={1, 2, 3, 4, 5}
$p_p$={0.0, 0.2, 0.4, 0.45, 0.499}

The deformation estimation unit 109 then generates deformation parameters as combinations of the Young's modulus ratios $p_y$ and the Poisson ratios $p_p$. For example, $N_p$=25 in the above case. Note that the Young's modulus ratio $p_y$ is a parameter to cope with the anisotropy of hardness of the breast, and represents a Young's modulus ratio in the anteroposterior direction (y-axis direction) of the human body to a Young's modulus at a coronal plane (x-z plane) of the human body.

The deformation estimation unit 109 then performs initialization (S903). In other words, the deformation estimation unit 109 sets 1 to a loop variable k, 0 to a maximum value $E_{MAX}$ of evaluation values (to be described later), and $p_1$ to a deformation parameter $p_{MAX}$.

The deformation estimation unit 109 then generates a deformed mesh DMk as a mesh after deformation by applying a physical deformation simulation based on the finite element method to the mesh M using the deformation parameter $p_k$ (S904). A deformation function Fk(x, y, z) at this time is defined as a displacement vector $dk_L$ (1≤L≤Nm) which gives displacement to each node from the mesh M to the deformed mesh DMk.

A compression deformation simulation using holding plates as a physical deformation simulation performed in step S904 will be described below with reference to FIGS. 14A and 14B. In compression deformation using the holding plates, when the two holding plates are moved to the center of the subject, the surface regions of the subject which come into contact with the holding plates after the movement stick to the holding plates.

Figure 14A:
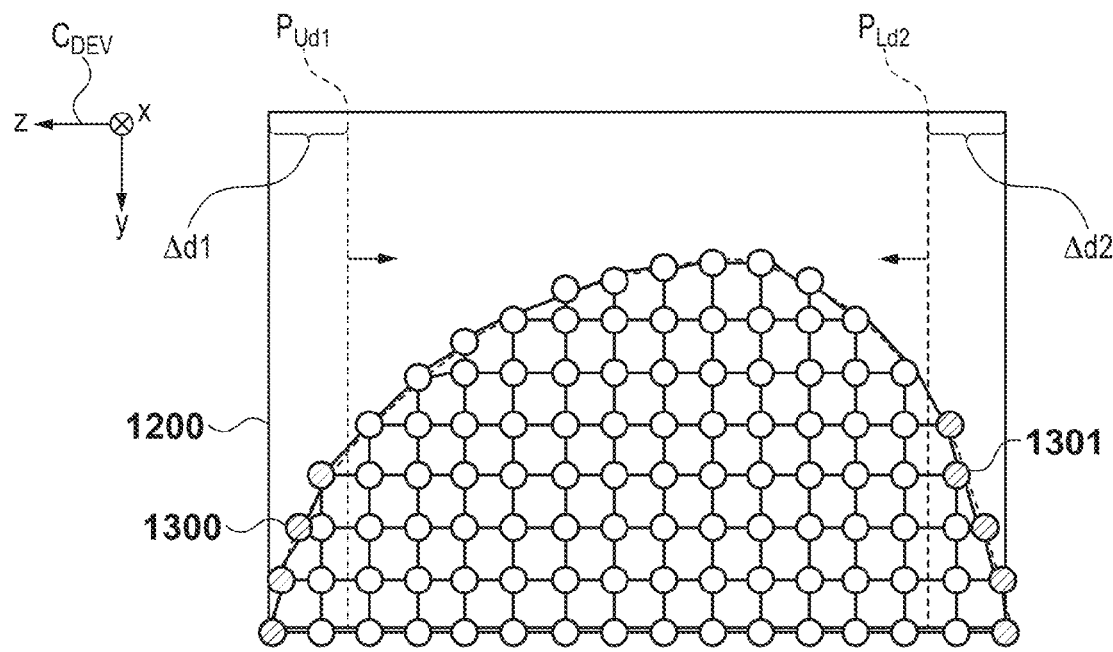
FIGS. 14A and 14B are views for explaining a compression deformation simulation using holding plates.

Assume that the two holding plates are moved by $\Delta d_1$ and $\Delta d_2$, respectively, as shown in FIG. 14A. The deformation estimation unit 109 then extracts outside surface nodes 1300 and 1301 which come into contact with holding plates $P_{Ud1}$ and $P_{Ld2}$ from the nodes of the mesh M, and obtains displacement amounts for making outside surface nodes 1300 and 1301 come into contact with the holding planes, respectively. The deformation estimation unit 109 executes a calculation based on the finite element method by providing these displacement amounts as boundary conditions C for a deformation simulation, and moves the two holding plates by $\Delta d_1$ and $\Delta d_2$, thereby generating a deformed mesh upon movement.

Figure 14B:
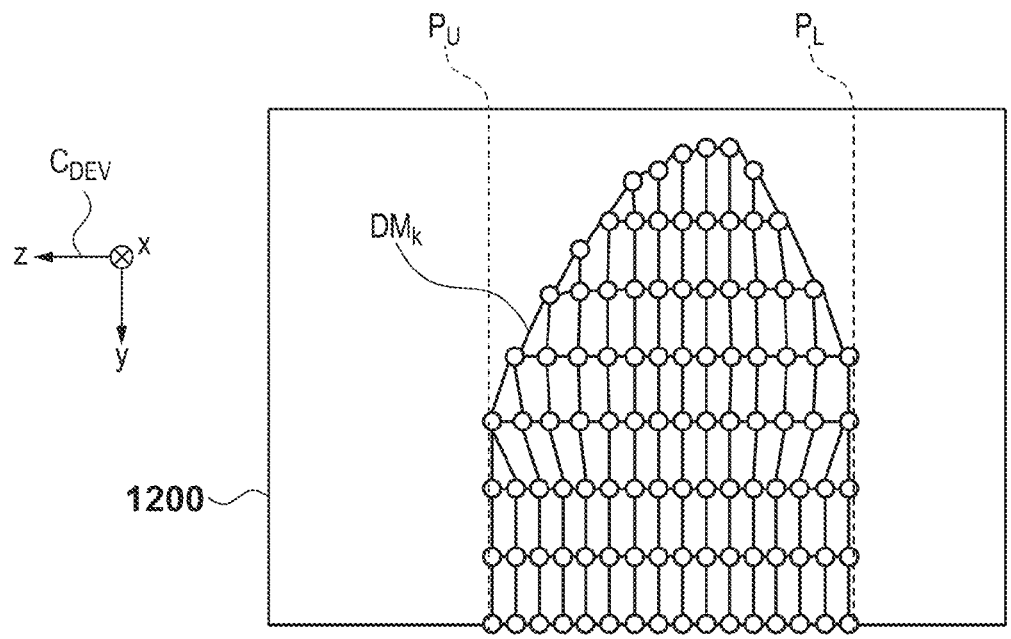

In this embodiment, the interval during which the two holding plates shown in FIG. 14B are moved to final holding positions $P_U$ and $P_L$ is divided into a plurality of (N) deformation simulations to cope with changes in boundary conditions which occur in the process of deformation. FIG. 14B shows the deformed mesh DMk as a result of repeating N deformation simulations. It is obvious from FIG. 14B that the physically deformed mesh is compressed in the z-axis direction and elongated in the y-axis direction between the holding positions $P_U$ and $P_L$ by physical deformation simulations.

The deformed image generation unit 110 generates a deformed MRI image by applying deformation corresponding to the deformation parameter $p_k$ to the deformed MRI image to output the deformed MRI image to the deformed image evaluation unit 111 (S905). In other words, the deformed image generation unit 110 performs coordinate transformation of the PAT apparatus coordinate system $C_{DEV}$ using the coordinate transformation matrix $T_{MtoD}$, and performs deformation processing using a deformation function Fk calculated in step S904. The deformed image generation unit 110 then generates a deformed MRI image $I_{D\_MRIonP}k$ in the PAT image coordinate system $C_{PAT}$ by coordinate transformation using the inverse matrix of the coordinate transformation matrix $T_{PtoD}$.

Figure 15A:
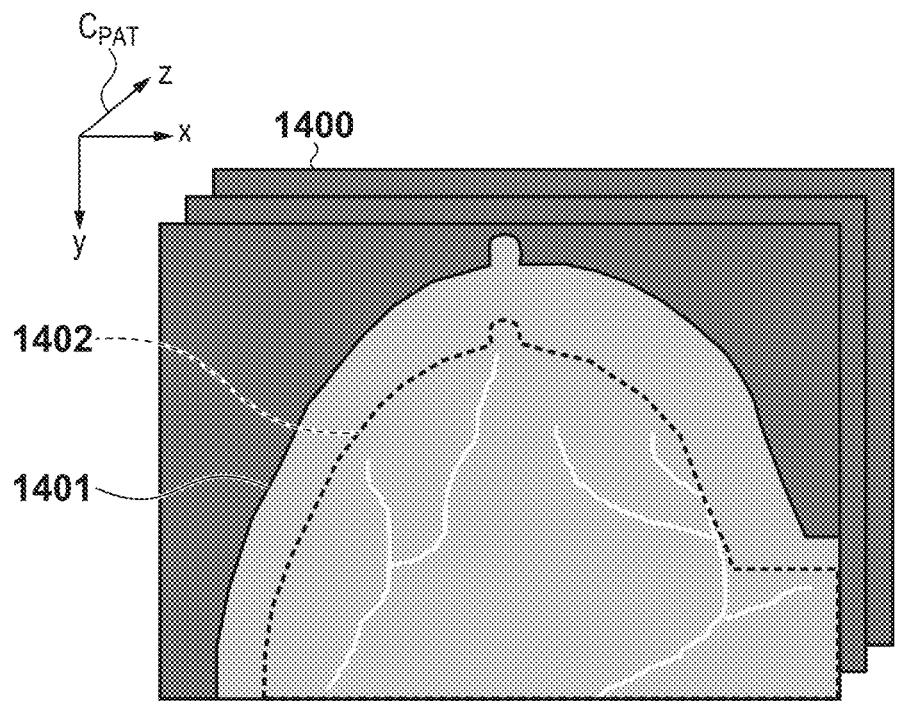
FIGS. 15A and 15B are schematic views showing a deformed MRI image $I_{D\_MRIonP}$.
Figure 15B:
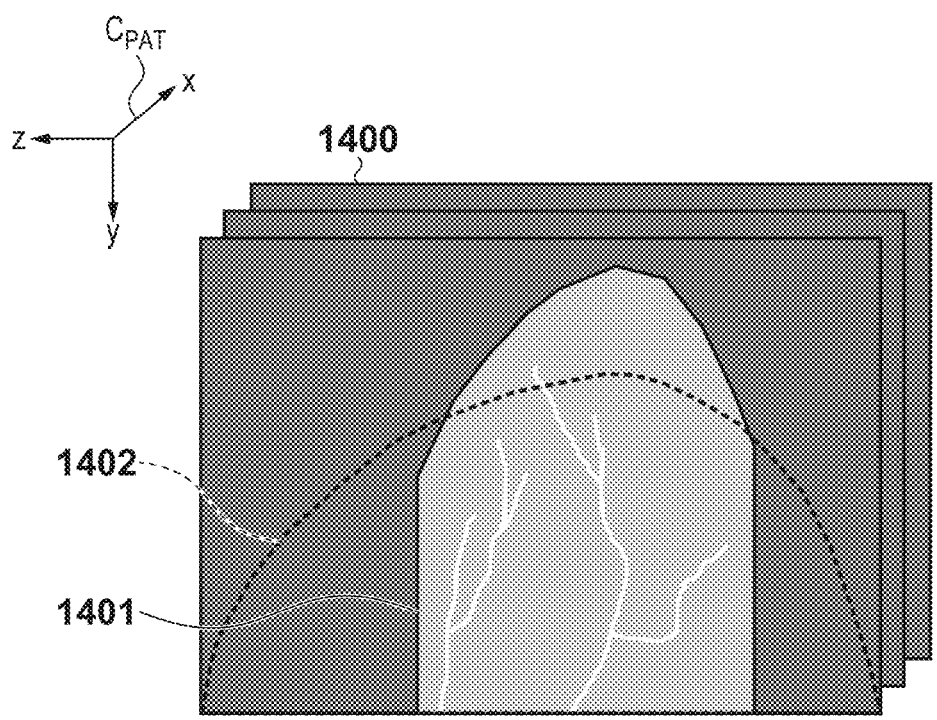

FIGS. 15A and 15B are schematic views showing the deformed MRI image $I_{D\_MRIonP}$. FIGS. 15A and 15B show a deformed MRI image 1400, a breast region 1401 after deformation, and a breast shape 1402 before deformation. FIG. 15A shows a two-dimensional image obtained by slicing the deformed MRI image $I_{D\_MRIonP}$ along an axial slice. FIG. 15B shows a two-dimensional image obtained by slicing the deformed MRI image $I_{D\_MRIonP}$ along a sagittal slice. A comparison between the breast region 1401 after deformation and the breast shape 1402 before deformation indicates that compression in the z-axis direction of the PAT image coordinate system $C_{PAT}$ elongates the breast region on the x-y plane and compresses the region in the z-axis direction.

The deformed image evaluation unit 111 outputs the PAT image acquired in step S203 and an evaluation value Ek of the appropriateness of the deformed MRI image $I_{D\_MRIonP}k$ calculated using the IR image in a held state which is acquired in step S205 to the deformation estimation unit 109 (S906). In other words, the deformed image evaluation unit 111 calculates the evaluation value Ek based on a similarity $S_{MRI}k$ ($0 \leq S_{MRI}, k \leq 1$) between the deformed MRI image and the PAT image and a residual error Rk between the breast shape in the deformed MRI image and the breast shape in the IR image in a held state.

Assume that the higher the evaluation value Ek, the more appropriate the deformation. In addition, as an evaluation criterion for the similarity $S_{MRI}k$, a mutual information amount between the images is used as in step S807. Note that the evaluation criterion to be used is not limited to this, and it is possible to use any known technique using a cross-correlation coefficient, SSD, the degree of coincidence of the position of a feature point such as a blood vessel branch portion.

FIG. 8 shows identical axial slices of the deformed MRI image ($I_{D\_MRIonP}k$) 1400 and the PAT image 600. The corresponding region 1500 indicated by the broken line rectangle is a region on the deformed MRI image 1400 corresponding to the PAT image 600. The similarity $S_{MRI}k$ is calculated between the PAT image 600 and the corresponding region 1500. If a blood vessel region 1501 in the deformed MRI image 1400 and a blood vessel region 1502 in the PAT image 600, which are visualized between the PAT image 600 and the corresponding region 1500, are similar to each other, the similarity $S_{MRI}k$ increases.

In addition, the residual error Rk is calculated as the difference between the contour (silhouette) shape of the subject depicted in an IR image and the exterior shape of the deformed mesh DMk projected on the IR image. When, for example, projecting the deformed mesh DMk on the IR image $I_{CAM1}$ in a held state, the deformed mesh DMk is coordinate-transformed to the front camera coordinate system $C_{CAM1}$ using the inverse matrix of the coordinate transformation matrix $T_{C1toD}$, and is projected and transformed onto the front camera coordinate system $C_{IMG1}$. It is also possible to project the deformed mesh DMk on the rear camera image $I_{CAM2}$ or side camera image $I_{CAM3}$ by the same method.

The residual error Rk is calculated as, for example, an integrated residual error (for example, the weighted average value of three residual errors) integrating the residual errors between the exteriors of meshes obtained by projecting the deformed mesh DMk on three IR images and the three IR images. Note however that the integrated residual error is not limited to the weighted average, and may be the maximum value, minimum value, median value, or the like of the three residual errors.

In addition, the residual error Rk may be calculated as the residual error between the nipple position of the subject depicted in an IR image and the nipple position of the deformed mesh DMk projected on the IR image. Obviously, the residual error Rk may be the value (for example, the weighted sum) obtained by integrating the residual error in breast shape and the residual error in nipple position. Note that the residual error based on breast shapes or nipple positions is acquired from IR images in the above description. However, a residual error may be acquired from a general camera image obtained by imaging the outer appearance of the breast.

The evaluation value Ek is represented as the weighted sum based on the similarity $S_{MRI}k$ and the residual error Rk according to the following equation.

$$Ek = aS_{MRI}k + b\{1/(1+Rk)\} \quad (1)$$

where $a$ and b are weight coefficients (a+b=1).

The reciprocal of (1+Rk) in the second term of equation (1) is used for the following reasons:

The residual error Rk is an index which decreases in value with an increase in the appropriateness of the deformation in reverse to the evaluation value Ek.

The range of values which the residual error Rk can take is 0 to 1 like the similarity $S_{MRI}k$.

The deformation estimation unit 109 compares the input evaluation value Ek with the maximum value $E_{MAX}$ of evaluation values (S907). If the evaluation value Ek exceeds the maximum value $E_{MAX}$ of evaluation values (Ek>$E_{MAX}$), the deformation estimation unit 109 updates $E_{MAX}$ ($E_{MAX}$=Ek), and updates the deformation parameter $p_{MAX}$ corresponding to the $E_{MAX}$ ($p_{MAX}=p_k$) (S808). If the evaluation value Ek is equal to or less than the maximum value $E_{MAX}$ of evaluation values (Ek≥$E_x$), the deformation estimation unit 109 performs no updating.

Subsequently, the deformation estimation unit 109 increments the loop variable k (S909), and compares the loop variable k with the total number Np of hypotheses (S910). If the loop variable k is equal to or less than the total number Np of hypotheses (k≤Np), the process returns to step S904. If the loop variable k exceeds the total number Np of hypotheses (k>Np), the process advances to step S911. In other words, the processing from step S904 to step S910 is repeated by the total number Np of hypotheses.

The deformation estimation unit 109 outputs the deformation parameter $p_{MAX}$ to the deformed image generation unit 110 (S911) when the processing that corresponds to the total number Np of hypotheses is complete. In other words, the deformation parameter $p_{MAX}$ corresponding to the maximum value $E_{MAX}$ of evaluation values is selected from a plurality of deformation parameters. The deformed image generation unit 110 obtains a deformed MRI image $I_{D\_MRIonP}$MAX corresponding to the deformation parameter $p_{MAX}$ as an estimation result ($I_{D\_MRIonP}$) of compression deformation, and outputs the deformed MRI image $I_{D\_MRIonP}$ to the image display unit 112 (S912).

With the above operation, the estimation of compression deformation (S209) by the deformation estimation unit 109, the deformed image generation unit 110, and the deformed image evaluation unit 111 is terminated. According to this processing, deformation simulations are executed under various types of deformation parameter hypotheses $p_k$. The deformed MRI image $I_{D\_MRIonP}$ is then generated by the deformation parameter $p_{MAX}$ which maximizes the evaluation value Ek for the appropriatenesses of deformations among these simulation results.

In this manner, it is possible to improve the accuracy of alignment between a PAT image and an MRI image by comparing the MRI image with the image captured by an infrared camera mounted in the PAT 12 and the PAT image, when a breast is a subject. In other words, a two-dimensional MIP image with an enhanced superficial vessel, which is generated from an MRI image, is compared with an IR image in an unheld state to estimate the position/posture of the subject on the MRI image relative to the infrared camera, thereby implementing accurate rigidity transformation between the MRI image and the IR image. In addition, the MRI image is coordinate-transformed from the infrared camera coordinate system to the coordinate system of the PAT 12 to use the rigidity alignment result as an initial state in deformation alignment processing between the MRI image and the PAT image. In other words, when performing alignment by comparing an MRI image with a PAT image, it is only required to estimate compression deformation from an unheld state to a held state. It is possible to accurately estimate compression deformation by deforming the MRI image so as to match the breast shape depicted in the IR image with the internal structure depicted in the PAT image.

Note that this embodiment uses the physical deformation simulation based on the finite element method as a technique of performing deformation alignment with respect to an MRI image. However, the embodiment is not limited to this method. For example, a general deformation method such as FFD (Free Form Deformation) may be used. In deformation processing using FFD, first of all, lattice-like control points are arranged to surround a subject in an image with a rectangular parallelepiped. Moving the control points can deform an image region existing in the rectangular parallelepiped. A set of deformation amounts of the respective control points is defined as deformation parameter candidate values (hypotheses) $p_k$ ($1 \leq k \leq Np$). Deformation alignment meeting the above purpose can be implemented by calculating the deformation parameter $p_k$ which maximizes the evaluation value Ek in the deformed image evaluation unit 111 while variously changing the value of the deformation parameter $p_k$.

Although this embodiment uses the breast of the human body as the subject, the embodiment is not limited to this. The subject can be anything as long as it is a region of a living body which has a superficial vessel. In addition, as an image registered in the medical image DB 11, an MRI image is used. However, an image captured by any modality can be used as long as the image is a three-dimensional image obtained by imaging a living body.

First Modification

According to the above description, evaluation values are calculated by exhaustively changing the rotational angle for obtaining the position/posture of a subject in an MRI image relative to an infrared camera, and a rotational angle that provides an optimal evaluation value is acquired (S207). However, it is possible to use another method of acquiring the position/posture of a subject in an MRI image. In other words, a rotational angle at which an optimal evaluation value is obtained may be estimated using a general optimization algorithm. For example, a method using the steepest descent method as one type of optimization algorithm will be described.

Let x be a three-dimensional vector, and (θx, θy, and θz) be a parameter representing the rotational angle of a subject in an MRI image relative to the infrared camera. When giving the vector x representing a rotational angle, let $S_{MIP}(x)$ be the similarity between the IR image generated in step S807 and the body surface neighboring MIP image. In the steepest descent method, when giving the vector x, a function f(x) for minimization is a reciprocal $1/S_{MIP}(x)$ of the similarity $S_{MIP}(x)$. In this case, the purpose of setting f(x) to the reciprocal of $S_{MIP}(x)$ is to obtain a parameter representing a rotational angle at which the similarity S(x) is maximized. The parameter x which minimizes f(x) (that is, maximizes $S_{MIP}(x)$) is calculated by updating and converging each variable set in the above manner using the following equation.

$$x^{(k-1)} = x^{(k)} - \alpha \cdot \text{grad } f(x^{(k)})$$

where α is a parameter (in general, a small positive constant) which determines the rate at which a numerical value is updated once, k is an update count, and grad $f(x^{(k)})$ is the gradient vector of the function f(x) at the kth update (which faces in a direction in which the change rate of the function f(x) is maximum).

The gradient vector grad $f(x^{(k)})$ is obtained by the following method. Let $x^{(k)} = (\theta x^{(k)}, \theta y^{(k)}, \theta z^{(k)})^T$ be the vector at the kth update. A function $f(x^{(k)} + \Delta x)$ is calculated when minute change amount $\Delta x = (\Delta \theta x, \Delta \theta y, \Delta \theta z)$ is given to each element of the vector $x^{(k)}$.

The change amount Δx is changed to evenly change the direction of the vector in the parameter space so as to calculate $f(x^{(k)} + \Delta x)$ corresponding to each amount Δx. $\Delta x(\Delta x_{MAX})$ which maximizes $f(x^{(k)}) - f(x^{(k)} + \Delta x)$ is obtained from a set of calculated $f(x^{(k)} + \Delta x)$. $\Delta x_{MAX}$ is a directional vector in the parameter space which maximizes the rate of change of $f(x^{(k)})$, and is equal to grad $f(x^{(k)})$.

In addition, as an optimization algorithm, any known method such as the Newton method may be used. This makes it possible to estimate a rotational angle that gives an optimal evaluation value with a smaller number of repetitions and speed up the processing.

Second Modification

In the above description, as evaluation values for evaluating the appropriateness of compression deformation of an MRI image, a similarity with a PAT image and a shape error with respect to the contour (silhouette) of a subject depicted in an infrared camera are used (S209). However, evaluation values may be obtained by other methods.

For example, a deformed MRI image is generated based on a deformed mesh. A body surface neighboring MIP image after deformation may be generated by projecting the deformed MRI image from the viewpoint of the infrared camera. The similarity between the body surface neighboring MIP image and an IR image may be calculated. This similarity may be added to an evaluation value.

In other words, in step S905, the deformation function Fk representing the displacement of each node from the mesh M to the deformed mesh DMk is generated. Rigidity transformation using the transformation matrix $T_{MtoC1}$ from the MRI image coordinate system $C_{MRI}$ to the front camera coordinate system $C_{CAM1}$ is applied to the MRI image, and the resultant image is deformed using the deformation function Fk, thereby generating the deformed MRI image $I_{D\_MRIonC1}k$.

Subsequently, a body surface neighboring deformed MIP image $I_{D\_MIPonC1}k$ using the neighborhood information of a surface region is generated from the deformed MRI image $I_{D\_MRIonC1}k$ by the same method as that used in steps S805 and S806. A similarity $S_{MIP}k$ between the body surface neighboring MIP image $I_{D\_MIPonC1}k$ and the IR image $I'_{CAM1}$ in a held state is then calculated. Lastly, the evaluation value Ek as the weighted sum of the similarity $S_{MRI}k$, the residual error Rk, and the calculated similarity $S_{MIP}k$ is calculated in step S906 according to the following equation.

$$Ek = aS_{MRI}k + b\{1/(1+Rk)\} + cS_{MIP}k \quad (3)$$

where a, b, and c are weight coefficients (a+b+c=1).

This makes it possible to obtain a deformation parameter by further using the information of a superficial vessel near the body surface and perform accurate alignment.

Third Modification

The above description has exemplified the case in which a superficial vessel is visualized using IR images obtained by near-infrared light. For example, it is possible to use an image visualizing a superficial vessel using polarization components obtained by internal reflection in the body. For example, the body surface is irradiated with light from a halogen light or the like. Surface reflection components reflected by the body surface are then discriminated from internal reflection components which temporarily enter the body and exit from the body surface after being absorbed and scattered inside the body. This will obtain an image visualizing information inside the body. In this image, like an IR image, components, of the internal reflection components, which correspond to the hemoglobin-absorbed portion of the interior of a blood vessel are depicted darker than the surroundings.

In this manner, a three-dimensional image captured by imaging a subject using the first imaging device and a two-dimensional image captured by imaging a surface of the subject using the second imaging device are acquired, and information indicating the surface position of the subject is acquired from the three-dimensional image. A projection image obtained when seeing the three-dimensional image from the viewpoint of the second imaging device is generated based on the information indicating the surface position. The three-dimensional image is aligned with the two-dimensional image with respect to the subject using the projection image and the two-dimensional image.

Second Embodiment

Image processing according to the second embodiment of the present invention will be described below. Note that the same reference numerals as in the first embodiment denote the same components in the second embodiment, and a detailed description of them will be omitted.

The first embodiment has exemplified the method of obtaining a rigidity transformation parameter between an image of a subject in an unheld state and an MRI image (alignment in an unheld state) and then estimating a deformation parameter between the image of the subject in a held state and the MRI image (estimating compression deformation). This method can include an error caused when a subject in an unheld state differs in shape from a subject in an MRI image or an error caused by the fine motion of the subject when it shifts from an unheld state to a held state.

The second embodiment will exemplify a method of simultaneously estimating a rigidity transformation parameter and a deformation parameter between an image of a subject in a held state (a subject in the second state) and an MRI image (the subject in the first state) without using measurement information concerning the subject in an upheld state.

Figure 16:
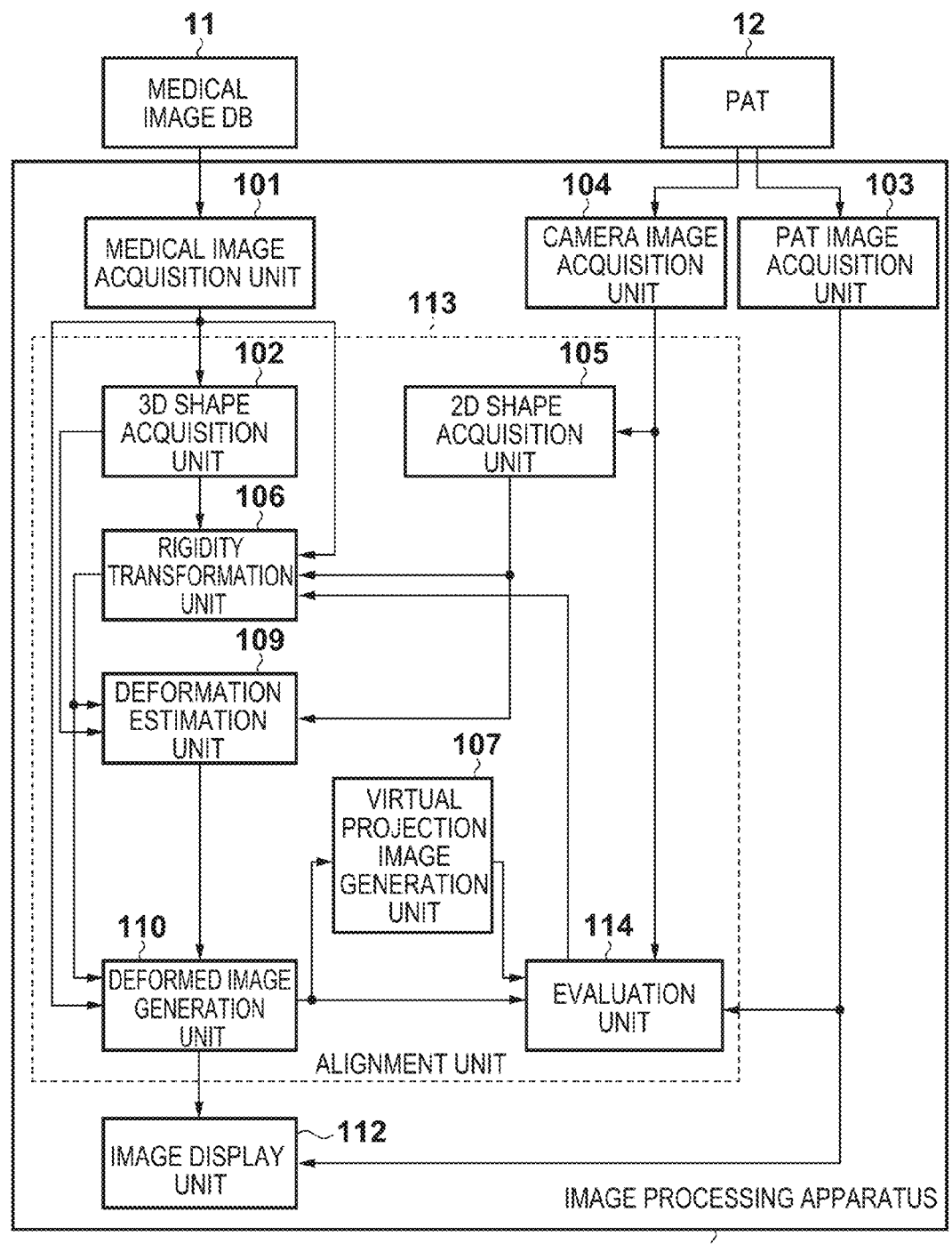
FIG. 16 is a block diagram showing the arrangement of a modality system including an image processing apparatus according to the second embodiment.

The block diagram of FIG. 16 shows the arrangement of a modality system including an image processing apparatus 10 according to the second embodiment. This arrangement differs from that in the first embodiment shown in FIG. 1 in that it includes an evaluation unit 114 in place of the virtual projection image evaluation unit 108 and the deformed image evaluation unit 111 in the first embodiment. In addition, the flow of information in an alignment unit 113 in the second embodiment differs from that in the first embodiment. This point will be described in detail in the description of the operation and processing by each unit.

Figure 17:
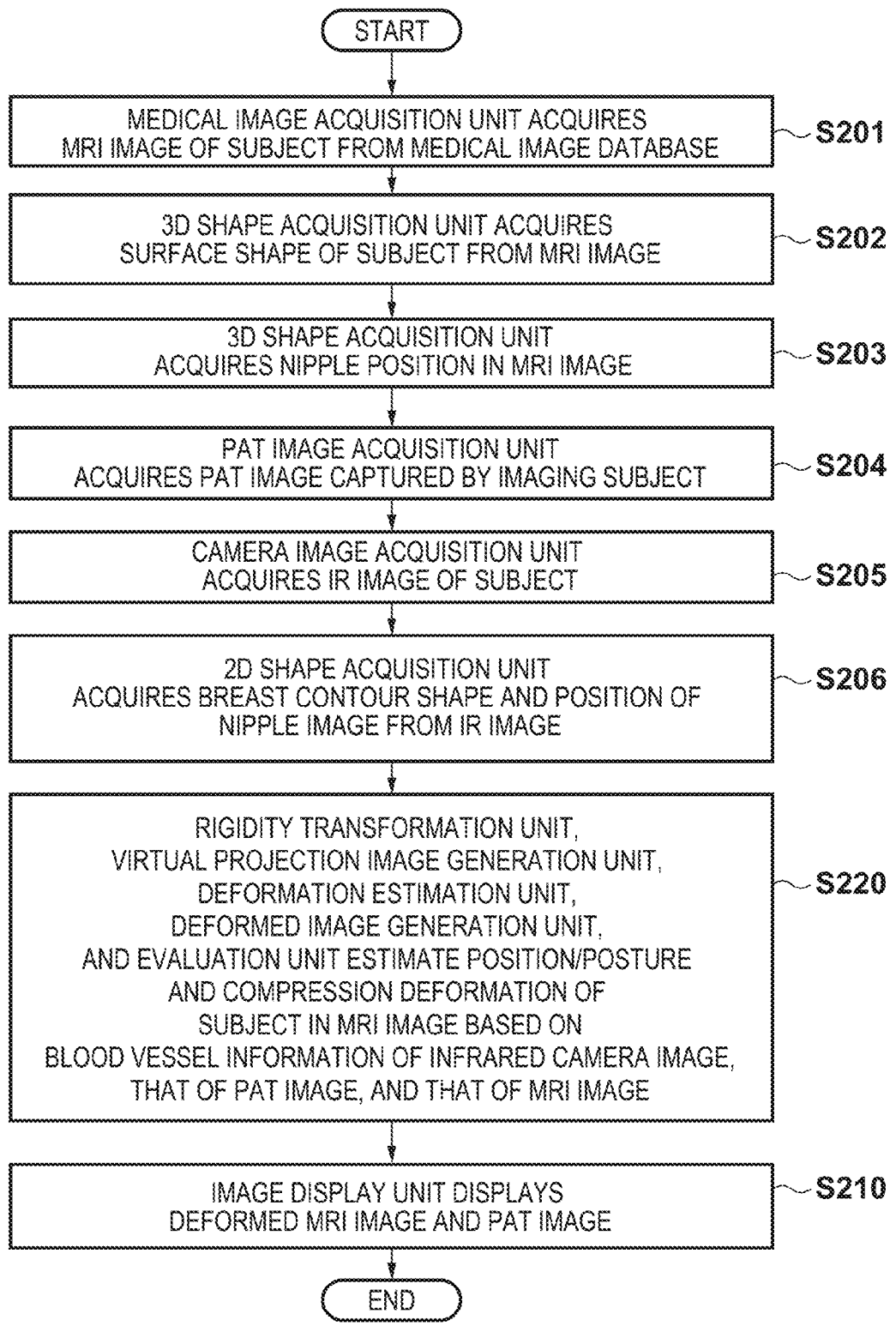
FIG. 17 is a flowchart for explaining the operation and processing by each unit of the image processing apparatus according to the second embodiment.

The operation and processing by the image processing apparatus 10 according to the second embodiment will be described with reference to the flowchart of FIG. 17. Note that operation and processing in steps S201 to S206 and S210 are the same as those in the first embodiment, and a detailed description of them will be omitted.

In step S220, the position/posture and compression deformation of a subject in an MRI image are estimated based on the blood vessel information of an IR image, that of a PAT image, and that of an MRI image. This processing is performed by a rigidity transformation unit 106, a virtual projection image generation unit 107, a deformation estimation unit 109, a deformed image generation unit 110, and the evaluation unit 114.

In the second embodiment, the position/posture of a subject on an MRI image relative to an infrared camera and a deformation parameter representing the compression deformation of the subject are alignment parameters. An MRI image is coordinate-transformed to the infrared camera coordinate system (front camera coordinate system) based on candidate values of hypothesized alignment parameters, and compression deformation is applied to the image, thereby generating a deformed MRI image based on the candidate values of the alignment parameters.

An MIP image is then generated by performing perspective projection of the generated deformed MRI image with reference to the viewpoint of the infrared camera. At this time, an MIP image with an enhanced superficial vessel in the breast is generated by visualizing only the luminance information of a region near the three-dimensional surface of the breast on each projection line from the viewpoint of the infrared camera or performing image processing so as to visualize the luminance information upon enhancing it.

The deformed MRI image is then coordinate-transformed from the infrared camera coordinate system (front camera coordinate system) to the PAT image coordinate system based on the position/posture of the infrared camera calibrated in advance with respect to a PAT 12.

Subsequently, the similarity between the IR image visualizing blood vessel information and the MIP image and the similarity between the PAT image and the deformed MRI image after coordinate transformation are calculated, and an evaluation value is calculated by integrating the similarities. The hypothesized alignment parameter is then changed to select an alignment parameter which maximizes an evaluation value. In other words, alignment including compression deformation is performed between the MRI image and the PAT image using the alignment parameter.

Figure 18:
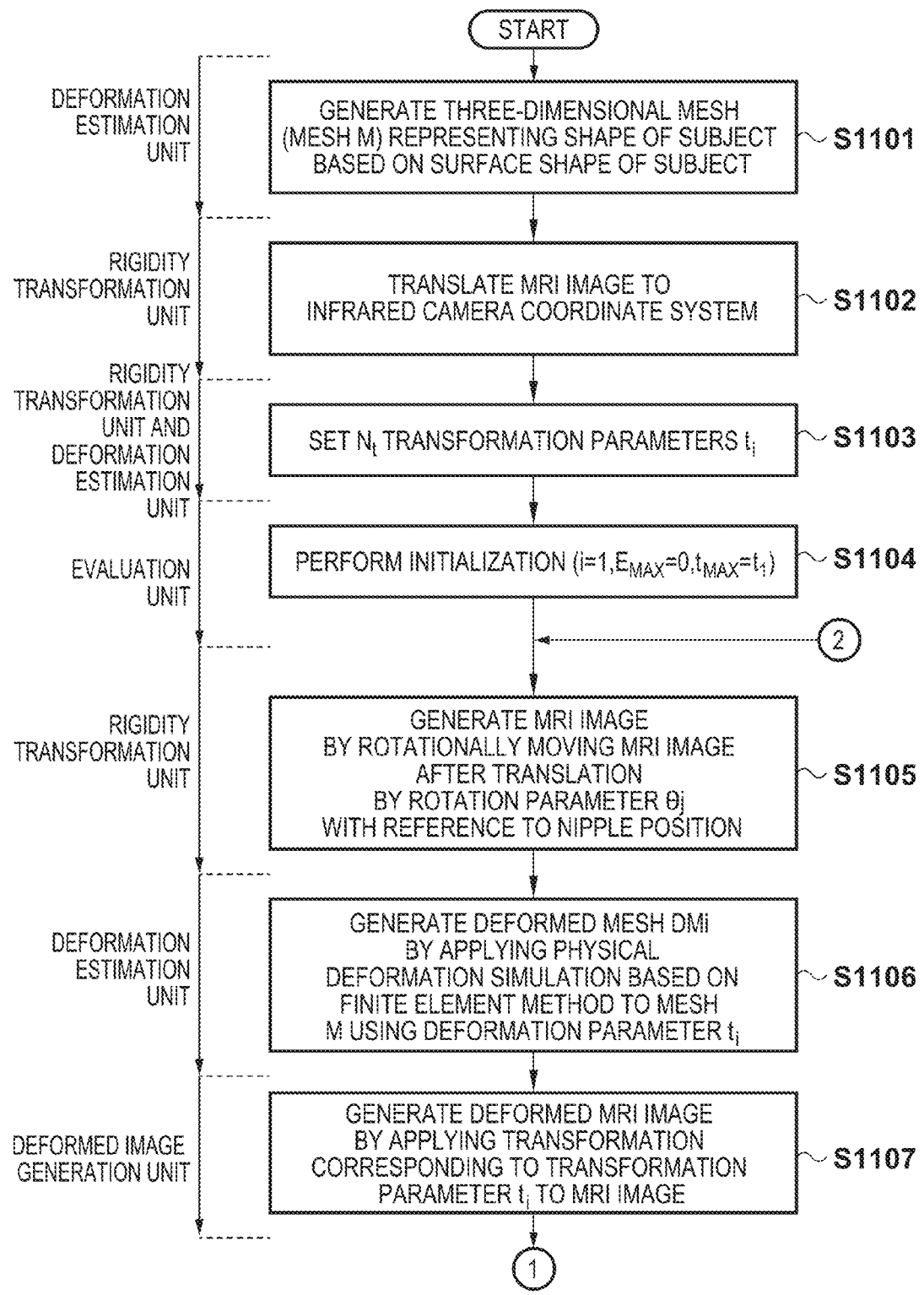

The estimation (S220) of a position/posture and compression deformation will be described in detail with reference to the flowcharts of FIGS. 18 and 19.

The deformation estimation unit 109 generates a mesh M representing the shape of a subject based on the surface shape of the subject acquired in step S202 (S1101). This processing is the same as that in step S901 in the first embodiment, and a detailed description of the processing will be omitted.

The rigidity transformation unit 106 translates an MRI image to the infrared camera coordinate system (S1102). The processing in step S1102 is performed based on the nipple position in the MRI image acquired in step S203 and the nipple position on the IR image in a held state which is acquired in step S206. This processing is the same as that in step S801 in the first embodiment, and a detailed description of the processing will be omitted. However, the processing in step S801 differs from the processing in step S1102, which is performed based on the IR image in a held state, in that it is performed based on the IR image in an upheld state.

Subsequently, the rigidity transformation unit 106 and the deformation estimation unit 109 set a plurality of (Nt) alignment parameter (transformation parameter) hypotheses $t_i$ ($1 \leq i \leq Nt$) by combining values which a rigidity transformation parameter can take and values which each component of the deformation parameter can take (S1103).

For example, the rigidity transformation unit 106 sets a plurality of ($N_\theta$) rotation parameters $\theta j$ ($1 \leq j \leq N_\theta$) as values which a rigidity transformation parameter can take as in step S802 in the first embodiment. The deformation estimation unit 109 sets a plurality of (Np) deformation parameters $p_k$ ($1 \leq k \leq Np$) which a deformation parameter can take as in step S902 in the first embodiment. The rotation parameters $\theta j$ are combined with the deformation parameters $p_k$ to set a plurality of (Nt=$N_\theta \times$Np) deformation parameters $t_i$ ($1 \leq i \leq Nt$). Note that since the relationship between the PAT image coordinate system and the front camera coordinate system is known, this operation is equivalent to setting candidate values of alignment parameters from the MRI image (the subject in the first state) to the PAT image (the subject in the second state). In addition, assume that the transformation parameter $t_i$ is shared between the rigidity transformation unit 106 and the deformation estimation unit 109.

The evaluation unit 114 performs initialization (S1104). In other words, the rigidity transformation unit 106 sets 1 to a loop variable i, 0 to a maximum value $E_{MAX}$ of evaluation values (to be described later), and $t_1$ to a transformation parameter $t_{MAX}$ (to be described later).

The rigidity transformation unit 106 generates an MRI image $I_{MRIonC1}i$ by rotationally moving the MRI image after translation by the transformation parameter $t_i$ (that is, $\theta j$) with reference to the nipple position. The rigidity transformation unit 106 then outputs the MRI image $I_{MRIonC1}i$ and a coordinate transformation matrix $T_{MtoC1}i$ to the deformation estimation unit 109 and the deformed image generation unit 110 (S1105). This processing is the same as that in step S804 in the first embodiment, and a detailed description of the processing will be omitted.

The deformation estimation unit 109 generates a deformed mesh DMi by applying a physical deformation simulation based on the finite element method to the mesh M using the transformation parameter $t_i$ (that is, $\theta j$ and $p_k$), and outputs a deformation function Fjk to the deformed image generation unit 110 (S1106). In other words, the deformation estimation unit 109 generates a mesh Mi by applying rigidity transformation corresponding to the rotation parameter $\theta j$ to the mesh M using the coordinate transformation matrix $T_{MtoC1}i$ derived in step S1105. The deformation estimation unit 109 then generates the deformed mesh DMi as a mesh after deformation by applying a physical deformation simulation to the mesh Mi. A deformation function Fi(x, y, z) at this time is defined as a displacement vector $di_L$ ($1 \leq L \leq Nm$) which gives displacement to each node from the mesh M to the deformed mesh DMi. Note that this processing is the same as that in step S904 in the first embodiment.

The deformed image generation unit 110 generates a deformed MRI image by applying transformation corresponding to the transformation parameter $t_i$ (that is, $\theta j$ and $p_k$) to the MRI image, and outputs the deformed MRI image to the virtual projection image generation unit 107 (S1107). In other words, the deformed image generation unit 110 coordinate-transforms the MRI image to a front camera coordinate system $C_{CAM1}$ corresponding to the rotation parameter $\theta j$ by applying rigidity transformation using the coordinate transformation matrix $T_{MtoC1}i$ to the MRI image. The deformed image generation unit 110 generates a deformed MRI image $I_{D\_MRIonC1}i$ by performing transformation processing using the deformation function Fjk with respect to the MRI image after coordinate transformation.

The virtual projection image generation unit 107 obtains the surface shape (a partial surface region) of the subject expected to enter the field of view when observing the deformed MRI image $I_{D\_MRIonC1}i$ from the viewpoint of a front infrared camera 505 in the front camera coordinate system $C_{CAM1}$ (S1108). This processing is equivalent to that in step S805 in the first embodiment except that the MRI image having undergone rigidity transformation is replaced by the deformed MRI image $I_{D\_MRIonC1}i$, and a detailed description of the processing will be omitted.

The virtual projection image generation unit 107 then generates a body surface neighboring deformed MIP image $ID_{\_MIPonC1}i$ using the neighborhood information of a surface region in the deformed MRI image $I_{D\_MRIonC1}i$, and outputs the body surface neighboring deformed MIP image to the evaluation unit 114 (S1109). This processing is equivalent to that in step S806 in the first embodiment except that the MRI image having undergone rigidity transformation is replaced by the deformed MRI image $I_{D\_MRIonC1}i$, and a detailed description of the processing will be omitted.

The deformed image generation unit 110 generates a deformed MRI image $I_{D\_MRIonP}i$ by coordinate-transforming the deformed MRI image $I_{D\_MRIonC1}i$ generated in step S1107 from the front camera coordinate system to the PAT image coordinate system, and outputs the deformed MRI image to the evaluation unit 114 (S1110). In other words, the deformed image generation unit 110 coordinate-transforms the deformed MRI image $I_{D\_MRIonC1}i$ to a PAT apparatus coordinate system $C_{DEV}$ using a coordinate transformation matrix $T_{C1toD}$. In addition, the deformed image generation unit 110 generates the deformed MRI image $I_{D\_MRIonP}i$ in a PAT image coordinate system $C_{PAT}$ by coordinate transformation using the inverse matrix of a coordinate transformation matrix $T_{PtoD}$.

The evaluation unit 114 calculates a similarity $S_{MIP}i$ ($0 \leq S_{MIP}i \leq 1$) between the body surface neighboring deformed MIP image $I_{D\_MIPonC1}i$ and the IR image in a held state, and a similarity $S_{MRI}i$ ($0 \leq S_{MRI}i \leq 1$) between the deformed MRI image $I_{D\_MRIonP}i$ and the PAT image. The evaluation unit 114 further calculates a residual error Ri in breast shape between the deformed MRI image $I_{D\_MRIonP}i$ and the IR image in a held state. The evaluation unit 114 then calculates an evaluation value Ei by integrating these similarities and the residual error (S1111).

The method of calculating the similarity $S_{MIP}i$ is the same as that in step S807 in the first embodiment except that the body surface neighboring MIP image $I_{MIPonC1}$ and the IR image in an upheld state are replaced by the body surface neighboring deformed MIP image $I_{D\_MIPonC1}i$ and the IR image in a held state. In addition, the method of calculating the similarity $S_{MRI}i$ is the same as that in step S906 in the first embodiment except that the deformed MRI image $I_{D\_MRI}k$ is replaced by the deformed MRI image $I_{D\_MRIonP}i$. In the method of calculating the residual error Ri, the residual error Ri is calculated as the difference between the shape of the contour (silhouette) of the subject depicted in the IR image and the external shape of a deformed mesh DMjk projected on the IR image. The manner of obtaining the residual error Ri is the same as that in step S906.

The evaluation value Ei is expressed as the weighted sum of the similarities $S_{MIP}i$ and $S_{MRI}i$ and the residual error Ri by $$Ei = aS_{MIP}i + bS_{MRI}i + c\{1/(1+Ri)\} \quad (4)$$

where a, b, and c are weight coefficients (a+b+c=1).

In addition, the third term of equation (4) uses the reciprocal of (1+Rk) for the same reason as that in step S906.

The evaluation unit 114 then compares the evaluation value Ei with the maximum value $E_{MAX}$ of evaluation values (S1112). If the evaluation value Ei exceeds the maximum value $E_{MAX}$ of evaluation values (Ei>$E_{MAX}$), the evaluation unit 114 updates $E_{MAX}$ ($E_{MAX}$=Ei), and updates a transformation parameter $t_{MAX}$ corresponding to the $E_{MAX}$ ($t_{MAX}$=$t_i$) (S1113). If the evaluation value Ei is equal to or less than the maximum value $E_{MAX}$ of evaluation values (Ei≤$E_{MAX}$), the evaluation unit 114 performs no updating.

Subsequently, the evaluation unit 114 increments the loop variable i (S1114), and compares the loop variable i with a total number Nt of hypotheses (S1115). If the loop variable i is equal to or less than the total number Nt of hypotheses (i≤Nt), the process returns to step S1105. If the loop variable i exceeds the total number Nt of hypotheses (i>Nt), the process advances to step S1116. In other words, the processing from step S1105 to step S1115 is repeated by the total number Nt of hypotheses.

When the processing corresponding to the total number Nt of hypotheses is complete, the evaluation unit 114 outputs the transformation parameter $t_{MAX}$ (that is, $\theta_{MAX}$ and $p_{MAX}$) corresponding to the maximum value $E_{MAX}$ of evaluation values to the deformed image generation unit 110 (S1116). In other words, the transformation parameter $t_{MAX}$ corresponding to the maximum value $E_{MAX}$ of evaluation value is selected from a plurality of transformation parameters. The deformed image generation unit 110 outputs the deformed MRI image $I_{D\_MRIonP}$ corresponding to the transformation parameter $t_{MAX}$ to the image display unit 112 (S1117).

With the above operation, the estimation of the position/posture and compression deformation (S220) by the rigidity transformation unit 106, the virtual projection image generation unit 107, the deformation estimation unit 109, the deformed image generation unit 110, and the evaluation unit 114 is terminated. According to this processing, the deformed MRI image $I_{D\_MRIonP}$ is generated by the transformation parameter $t_{MAX}$ which maximizes the evaluation value Ei for the appropriateness of deformation among the results of performing transformation including compression deformation when hypothesizing the transformation parameter $t_i$ representing various types of rotation and deformation.

The position/posture and compression deformation of the subject on the MRI image are estimated by comparing the blood vessel information of the MIP image with an enhanced superficial vessel which is generated by compressing and deforming the MRI image, that of the IR image in a held state, and that of the PAT image. This makes it possible to implement accurate deformation alignment even when an ideal IR image in an ideal unheld state has not been captured at the time of capturing a PAT image or when the position/posture of the breast changes during a shift from an unheld state to a held state.

Modification of Second Embodiment

The above description has exemplified the case in which the evaluation value Ei is used, while incorporating the blood vessel information of a PAT image and that of an IR image. However, there is no need to simultaneously use these pieces of information. For example, deformation alignment may be executed using the blood vessel information of the PAT image first and then using the blood vessel information of the IR image.

For example, the transformation parameter $t_i$ is changed, and the similarity between a deformed MRI image and a PAT image is evaluated to obtain the transformation parameter $t_{MAX}$ which maximizes the evaluation value. The transformation parameter $t_i$ is then changed under limitation to near the transformation parameter $t_{MAX}$ to evaluate the similarity between the body surface neighboring deformed MIP image $I_{MIPonC1}i$ and the IR image, thereby obtaining a transformation parameter $t_{MAX2}$ which maximizes the evaluation value. The deformed MRI image corresponding to the transformation parameter $t_{MAX2}$ is then set as a compression deformation alignment result. With this operation, after the execution of coarse deformation alignment using a PAT image depicting rough blood vessel information as a morphological image with respect to an MRI image, it is possible to execute accurate deformation alignment using an IR image depicting more precise blood vessel information as a functional image.

In addition, as in the first embodiment, after a rigidity transformation parameter in an upheld state is estimated, the setting range of hypotheses of θj may be limited to near a rigidity transformation parameter, and a rigidity transformation parameter in a held state and a deformation parameter may be estimated. This decreases the total number of hypotheses and speeds up the processing. Obviously, as in the first modification of the first embodiment, a transformation parameter may be obtained using a general optimization algorithm instead of evaluation by round-robin matching of hypotheses. In this case, it is possible to use a rigidity transformation parameter estimated in an upheld state as the initial value of θj.

Third Embodiment

Image processing according to the third embodiment of the present invention will be described below. Note that the same reference numerals as in the first and second embodiments denote the same components in the third embodiment, and a detailed description of them will be omitted.

The first and second embodiments have exemplified the case in which alignment from an MRI image to a PAT image is performed based on the captured image of the breast imaged by the infrared camera mounted in the PAT 12 and the MIP image with an enhanced superficial vessel which is generated from the MRI image. However, a target image for alignment with a three-dimensional image using the three-dimensional image a subject imaged in advance, such as an MRI image, and the information of a superficial vessel in the subject which is depicted on the infrared camera is not limited to a PAT image.

For example, an image of a slice (to be referred to as a "corresponding slice" hereinafter) corresponding to an imaging slice of an ultrasonic image is generated (clipped) from a CT image or MRI image as a three-dimensional image to be presented for the purpose of diagnosis support.

The third embodiment will exemplify a case in which a subject at the time of capturing an MRI image is aligned with a subject at the time of capturing an ultrasonic image based on an ultrasonic image, images of a subject which are captured by infrared cameras whose positional relationship are associated with each other in advance, and an MIP image with an enhanced superficial vessel in the subject which is generated from an MRI image. In the following description, when a breast is a subject, the subject at the time of capturing an MRI image and the subject at the time of capturing an ultrasonic image are sometimes called the "subject in the first state" and the "subject in the second state", respectively.

In addition, in the third embodiment, the MRI image captured in advance is the image obtained by imaging the breast as the subject in the first state which is in a prone position, and the ultrasonic image is the image obtained by imaging the breast as the subject in the second state which is in the supine position. In order to align the MRI image with the ultrasonic image, therefore, it is necessary to estimate not only rigidity transformation between the two images but also gravitational deformation. A procedure for processing in the third embodiment will be described below.

An ultrasonic probe mounted in an ultrasonic imaging apparatus is brought into contact with a subject in a supine position to capture an ultrasonic image. The ultrasonic probe is attached with a sensor (magnetic system, optical system, or the like) which measures the position/posture of the probe. This sensor measures the position/posture of the ultrasonic probe during the execution of ultrasonic imaging. In other words, the sensor measures the imaging region of an ultrasonic image in a coordinate system (to be referred to as a "sensor coordinate system" hereinafter) with reference to the sensor.

In addition, the position/posture of the infrared camera mounted to image a subject is calibrated in the sensor coordinate system. It is therefore possible to associate an ultrasonic image with the position/posture of an image through the sensor coordinate system. An IR image in which a superficial vessel of a breast in a supine position is depicted is acquired, which is captured by the infrared camera.

As in the first and second embodiments, a three-dimensional surface shape of the breast is extracted from the MRI image obtained by imaging the subject. Subsequently, candidate values of alignment parameters which represent various positions/postures and gravitational deformations of the subject on the MRI image relative to the infrared camera are hypothesized, and a deformed MRI image having undergone gravitational deformation and alignment is generated for each of the candidate values of the alignment parameters.

An MIP image with an enhanced superficial vessel on the infrared camera side is generated using body surface neighborhood information in each deformed MRI image. Subsequently, the position/posture and gravitational deformation of the subject on the MRI image relative to the infrared camera which maximize the similarity between each MIP image and a corresponding IR image are estimated.

Based on the position/posture of the IR image corresponding to the ultrasonic image which is associated in advance, a deformed MRI image is generated by deformation alignment of the MRI image with the coordinate system of the ultrasonic image. Deformation alignment is then performed between the deformed MRI image and the ultrasonic image.

It is possible to estimate the position/posture and gravitational deformation of the subject on the MRI image relative to the infrared camera by comparing the IR image in the supine position with the MIP image with the enhanced superficial vessel on the infrared camera side, which is obtained by gravitational deformation of the MRI image, in this manner. This makes it possible to implement accurate deformation alignment between the infrared camera and an MRI image and to perform accurate deformation alignment between an ultrasonic image wand the MRI image using the positional relationship between the ultrasonic image and the infrared camera.

First Modification of Third Embodiment

In the third embodiment, in order to correct the deformed state of the breast between the MRI image captured in a prone position and the ultrasonic image captured in a supine position, in addition to the position/posture and of the subject on the MRI image relative to the infrared camera, the gravitational deformation is also estimated.

If, however, a three-dimensional image such as a CT image or MRI image to be aligned with an ultrasonic image has been captured in the same supine position as that of the ultrasonic image, there is no need to perform any correction by gravitational deformation between the two images. Processing in such a case will be described concerning only a difference (alignment of the subject in the second state in the infrared camera with respect to the subject in the first state on an MRI image) from the processing in the third embodiment.

First of all, candidate values of alignment parameters which variously change only the position/posture of a subject on an MRI image relative to the infrared camera are hypothesized, and an MIP image with an enhanced superficial vessel is generated using body surface neighborhood information in an MRI image for each hypothesized position/posture.

The similarity between each generated MIP image and a corresponding IR image is evaluated to estimate the position/ posture of a subject on an MRI image relative to the infrared camera which maximizes the evaluation value. This makes it possible to perform accurate rigidity alignment between an ultrasonic image and a three-dimensional image to be aligned, when the subject can be regarded as a rigid body.

Second Modification of Third Embodiment

The third embodiment has exemplified the case in which a three-dimensional image of a subject such as an MRI image is aligned with a two-dimensional ultrasonic image, acquired by an ultrasonic probe measured by a position/posture sensor, using an IR image.

A target to be aligned with a three-dimensional image of a subject may be, for example, a two-dimensional PAT image acquired by the ultrasonic probe measured by the position/ posture sensor as well as an ultrasonic image. Letting the ultrasonic prove have a near-infrared light source will acquire a two-dimensional PAT image with the same arrangement as that for an ultrasonic image except that the human body is irradiated with near-infrared light instead of ultrasonic waves. Therefore, the position/posture and gravitational deformation of a subject on an MRI image relative to the infrared camera are estimated in the same manner as in the third embodiment. It is then possible to perform accurate deformation alignment between a two-dimensional PAT image and an MRI image using the positional relationship between the two-dimensional PAT image and the infrared camera, which is known from the position/posture sensor.

Fourth Embodiment

Image processing according to the fourth embodiment of the present invention will be described below. Note that the same reference numerals as in the first to third embodiments denote the same components in the fourth embodiment, and a detailed description of them will be omitted.

In the first to third embodiments, the first processing is to estimate the position/posture and deformed state of a three-dimensional image of a subject, such as an MRI image captured in advance, relative to the infrared camera. The second processing is to align the three-dimensional image with a target modality using the positional relationship between the modality and the infrared camera.

However, only the first processing may be executed. In other words, the only processing to be executed may estimate the position/posture and deformation of a three-dimensional image of a subject in the first state, captured in advance, relative to the subject captured by the infrared camera, using the information of a superficial vessel depicted in each of the two images, In other words, the IR image and the three-dimensional image of the subject in the second state captured in advance.

Estimating the above position/posture and deformation can align a three-dimensional image of the subject, such as an MRI image or CT image, captured in advance, with the infrared camera depicting the subject during, for example, a surgical operation on the subject. This makes it possible to refer to a lesion or the like depicted in a three-dimensional image in association with the subject under operation.

As described above, it is possible to provide a mechanism of accurately and automatically aligning a three-dimensional image such as an MRI image or CT image with a subject using a two-dimensional image captured by the infrared camera and the information of an internal structure near the surface of the subject, which is acquired from the three-dimensional image. It is therefore possible to implement accurate alignment between a PAT image and a three-dimensional image such as an MRI image or CT image.

Other Embodiment

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

For example, at least one of an image acquisition unit, an information acquisition unit, a first generation unit, or an alignment unit is implemented using a processor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-214140 filed Oct. 11, 2013 which is hereby incorporated by reference herein in its entirety.

What is claimed is:

1. An image processing apparatus comprising:
an image acquisition unit configured to acquire a three-dimensional image captured by imaging a subject using a first imaging device and a two-dimensional image captured by imaging a surface of the subject using a second imaging device;
an information acquisition unit configured to acquire information representing a surface position of the subject from the three-dimensional image;
a first generation unit configured to generate a projection image in a case where seeing the three-dimensional image from a viewpoint of the second imaging device, based on the information representing the surface position; and
an alignment unit configured to align the three-dimensional image with the two-dimensional image with respect to the subject using the projection image and the two-dimensional image.

2. The apparatus according to claim 1, wherein the first generation unit generates a plurality of the projection images based on the information representing the surface position and a plurality of candidate values of alignment parameters representing alignment between the three-dimensional image and the two-dimensional image.

3. The apparatus according to claim 2, wherein the first generation unit obtains a partial region at the surface position observed by the second imaging device, based on each of the plurality of candidate values, and generates the plurality of projection images using information of the partial region.

4. The apparatus according to claim 3, wherein the first generation unit generates a maximum intensity projection (MIP) image of the partial region seen from the viewpoint of the second imaging device as the projection image.

5. The apparatus according to claim 2, wherein the alignment unit estimates an alignment parameter between the three-dimensional image and the two-dimensional image from the plurality of candidate values using the plurality of projection images and the two-dimensional image.

6. The apparatus according to claim 2, further comprising a first estimation unit configured to evaluate a similarity between each of the plurality of projection images and the two-dimensional image,
wherein the alignment unit selects one of the plurality of candidate values as an alignment parameter between the three-dimensional image and the two-dimensional image based on the similarity.

7. The apparatus according to claim 6, wherein the first evaluation unit evaluates the similarity based on luminance information of a superficial vessel of the subject which is visualized in each of the projection image and the two-dimensional image.

8. The apparatus according to claim 1, wherein the alignment parameter comprises at least a deformation parameter representing deformation of the subject, and
the first generation unit generates a deformed three-dimensional image by applying deformation to the three-dimensional image based on a plurality of candidate values of deformation parameters concerning the subject as the projection image seen from the viewpoint of the second imaging device.

9. The apparatus according to claim 6, wherein the image acquisition unit acquires the three-dimensional image captured by imaging the subject in a first state using the first imaging device, the two-dimensional image captured by imaging the subject in a second state using the second imaging device, and a three-dimensional image captured by imaging the subject in the second state using the second imaging device, wherein the image processing apparatus further comprises a second estimation unit configured to evaluate a similarity between a three-dimensional image, obtained by transforming a three-dimensional image in the first state based on each of the plurality of candidate values, and a three-dimensional image in the second state, and wherein the alignment unit selects one of the plurality of candidate values as an alignment parameter between the three-dimensional image in the first state and the second two-dimensional image based on evaluation results obtained by the first evaluation unit and the second evaluation unit.

10. The apparatus according to claim 9, further comprising a second generation unit configured to generate a deformed three-dimensional image by transforming the three-dimensional image in the first state using an alignment parameter between the three-dimensional image in the first state and the two-dimensional image.

11. The apparatus according to claim 10, further comprising a display unit configured to display the three-dimensional image in the second state and the deformed three-dimensional image on a monitor.

12. The apparatus according to claim 1, wherein the second imaging device comprises an infrared camera configured to capture the two-dimensional image.

13. An image processing method comprising:
using a processor to perform steps of:
acquiring a three-dimensional image captured by imaging a subject using a first imaging device and a two-dimensional image captured by imaging a surface of the subject using a second imaging device;
acquiring information representing a surface position of the subject from the three-dimensional image;
generating a projection image in a case where seeing the three-dimensional image from a viewpoint of the second imaging device, based on the information representing the surface position; and
aligning the three-dimensional image with the two-dimensional image with respect to the subject using the projection image and the two-dimensional image.

14. A non-transitory computer readable medium storing a computer-executable program for causing a computer to perform an image processing method, the method comprising:
acquiring a three-dimensional image captured by imaging a subject using a first imaging device and a two-dimensional image captured by imaging a surface of the subject using a second imaging device;
acquiring information representing a surface position of the subject from the three-dimensional image;
generating a projection image in a case where seeing the three-dimensional image from a viewpoint of the second imaging device, based on the information representing the surface position; and
aligning the three-dimensional image with the two-dimensional image with respect to the subject using the projection image and the two-dimensional image.

* * * * *